United States Patent
Kuwahara et al.

(10) Patent No.: US 7,920,948 B2
(45) Date of Patent: Apr. 5, 2011

(54) ASSUMPTION TORQUE SETTING DEVICE, AUTOMATIC TRANSMISSION CONTROLLER, AND METHOD FOR LEARNING INTERNAL COMBUSTION ENGINE DELAY MODEL

(75) Inventors: Seiji Kuwahara, Toyota (JP); Masato Kaigawa, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 30 days.

(21) Appl. No.: 12/411,827

(22) Filed: Mar. 26, 2009

(65) Prior Publication Data

US 2009/0248261 A1  Oct. 1, 2009

(30) Foreign Application Priority Data

Mar. 26, 2008  (JP) .................................. 2008-081404

(51) Int. Cl.
  *F16H 59/14*  (2006.01)
  *B60W 10/10*  (2006.01)
(52) U.S. Cl. ............................. 701/54; 701/59; 477/109
(58) Field of Classification Search .................. None
  See application file for complete search history.

(56) References Cited

U.S. PATENT DOCUMENTS

| | | | | |
|---|---|---|---|---|
| 5,577,979 | A | * | 11/1996 | Iizuka ............................ 477/109 |
| 6,023,647 | A | * | 2/2000 | Saito et al. ....................... 701/57 |
| 6,233,922 | B1 | * | 5/2001 | Maloney ......................... 60/276 |
| 2003/0109357 | A1 | * | 6/2003 | Tabata .......................... 477/109 |

FOREIGN PATENT DOCUMENTS

| | | |
|---|---|---|
| DE | 199 62 963 A1 | 6/2001 |
| DE | 102 96 801 T5 | 4/2004 |
| JP | 04-357359 | 12/1992 |
| JP | 5-280625 | 10/1993 |
| JP | 08-290729 | 11/1996 |
| JP | 09-095160 | 4/1997 |
| JP | 11-094057 | 4/1999 |
| JP | 2000-170890 | 6/2000 |
| JP | 2004-125066 | 4/2004 |
| JP | 2005-337053 | 12/2005 |
| JP | 2006-183506 | 7/2006 |
| JP | 2006-329217 | 12/2006 |
| JP | 2007-198157 | 8/2007 |
| KR | 10-0460867 | * 12/2004 |

OTHER PUBLICATIONS

German Office Action dated Aug. 5, 2010 in corresponding German Application No. 10 2009 001 911 (with English translation).

* cited by examiner

*Primary Examiner* — Michael J. Zanelli
(74) *Attorney, Agent, or Firm* — Oblon, Spivak, McClelland, Maier & Neustadt, L.L.P.

(57) ABSTRACT

An assumption torque setting device for an engine that executes a torque reduction process during gear shifting. The device sets a torque assumed to be output by the engine and based on a target torque from which an amount corresponding to the torque reduction process is excluded as an assumption torque during the gear shifting. The device includes an assumption model torque calculation unit which calculates an assumption model torque from the target torque from which an amount corresponding to the torque reduction process is excluded based on an internal combustion engine delay model. An assumption torque calculation unit calculates before torque reduction is performed an assumption torque based on an engine operation state and calculates when the torque reduction is being performed an assumption torque based on the assumption model torque and an assumption torque calculated from the engine operation state.

17 Claims, 16 Drawing Sheets

ASSUMPTION TORQUE SETTING DEVICE, AUTOMATIC TRANSMISSION CONTROLLER, AND METHOD FOR LEARNING INTERNAL COMBUSTION ENGINE DELAY MODEL

BACKGROUND OF THE INVENTION

The present invention relates to an assumption torque setting device for setting, in an internal combustion engine that executes a torque reduction process during a gear shifting period, a torque assumed to be output by the internal combustion engine that is based on a target torque from which an amount corresponding to the torque reduction process is excluded as an assumption torque during the gear shifting period. The present invention also relates to an automatic transmission controller using the assumption torque setting device. Further, the present invention relates to a method for learning or determination of an internal combustion engine delay model that can be applied to the assumption torque setting device and the automatic transmission controller.

Japanese Laid-Open Patent Publication No. 5-280625 (pp. 4-5, FIG. 7) proposes a technique for holding a line pressure in an automatic transmission calculated from an input torque when a gear shifting period starts (e.g., gear shifting period after inertia phase) and controlling the automatic transmission with the held line pressure during the subsequent gear shifting period to stabilize gearshift control.

The engine load may greatly change due to a change in throttle opening during the gear shifting period in which the line pressure is held for stable control of the automatic transmission. In such a case, this would increase the difference between the line pressure actually required when completing the gear shifting period and the held line pressure and thereby produce a gear shifting shock. To prevent such a shock, Japanese Laid-Open Patent Publication No. 2006-329217 (pp. 11-16, FIGS. 6 to 17) proposes a technique for setting a hypothetical engine torque based on the acceleration pedal during the gear shifting period.

However, in the technique of Japanese Laid-Open Patent Publication No. 2006-329217, during a gear shifting period, the hypothetical engine torque is set to be close to the target torque, which is obtained from the operation state of the internal combustion engine, particularly, the depression amount of the acceleration pedal. Thus, the response state of the actual output torque relative to the target torque in the internal combustion engine is not taken into consideration, and the hypothetical engine torque is not accurate. Accordingly, the automatic transmission control based on such hypothetical engine torque is not accurate, and therefore a step is formed between the hypothetical engine torque and the actual torque when gear shifting is completed. This may produce gear shifting shock.

SUMMARY OF THE INVENTION

It is an object of the present invention to obtain a highly accurate assumption torque that smoothly varies during a gear shifting period by taking the response state into consideration. Another object of the present invention is to realize highly accurate and smooth gear shift control by suppressing the gear shifting shock. A further object of the present invention is to provide a method for learning or determining an internal combustion engine delay model that contributes to obtaining a highly accurate assumption torque.

One aspect of the present invention is an assumption torque setting device for an internal combustion engine that executes a torque reduction process during a gear shifting period. Torque is set that is assumed to be output by the internal combustion engine that is based on a target torque from which an amount corresponding to the torque reduction process is excluded as an assumption torque during the gear shifting period. The assumption torque setting device includes an assumption model torque calculation unit which calculates an assumption model torque from the target torque from which an amount corresponding to the torque reduction process is excluded based on an internal combustion engine delay model. An assumption torque calculation unit calculates before torque reduction is performed in the torque reduction process an assumption torque based on an internal combustion engine operation state and calculates when the torque reduction is being performed in the torque reduction process an assumption torque based on the assumption model torque and an assumption torque calculated from the internal combustion engine operation state.

Another aspect of the present invention is an assumption torque setting device for an internal combustion engine that executes a torque reduction process during a gear shifting period. Torque is set that is assumed to be output by the internal combustion engine that is based on a target torque from which an amount corresponding to the torque reduction process is excluded as an assumption torque during the gear shifting period. The assumption torque setting device includes a delay model adaptation unit which adapts an internal combustion engine delay model representing delay from the target torque to a torque output to the actual internal combustion engine by learning a delayed state of the internal combustion engine during periods other than the gear shifting period. A first assumption torque calculation unit calculates the assumption torque based on an internal combustion engine operation state before torque reduction is performed in the torque reduction process during the gear shifting period. A second assumption torque calculation unit calculates the assumption torque from the target torque from which an amount corresponding to the torque reduction process is excluded based an the internal combustion engine delay model when the torque reduction is being performed in the torque reduction process during the gear shifting period.

A further aspect of the present invention is a method for learning an internal combustion engine model for calculating an output torque based on a target torque by using parameters including a primary delay time constant, wasted time, and torque error. The method includes learning the torque error based on a difference between an output torque, which is calculated from the target torque based on the internal combustion engine delay model, and the assumption torque, which is calculated from the internal combustion engine operation state, when fluctuation is small in both of the output torque and the assumption torque.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

First Embodiment

Figure 1:
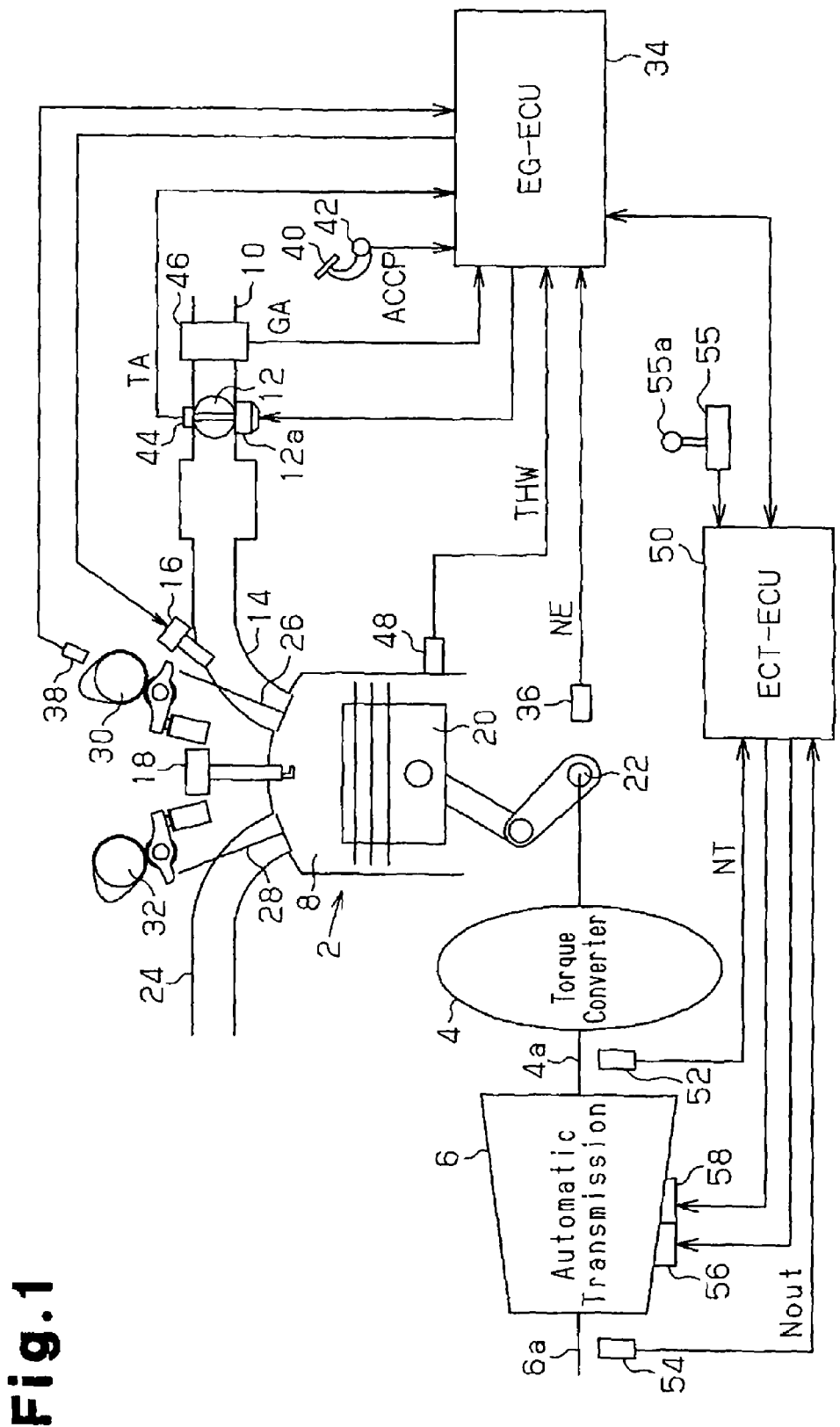
FIG. 1 is a schematic block diagram showing the structure of a vehicle internal combustion engine, a drive system, and a control system in a first embodiment of the present invention.

FIG. 1 is a schematic block diagram showing the structure of a vehicle internal combustion engine, a drive system, and a control system to which the present invention is applied. The internal combustion engine is a gasoline engine (hereinafter simply referred to as the engine) 2. The drive system includes a torque converter 4 and an automatic transmission 6. The rotational drive force of the engine 2, which is transmitted to the automatic transmission 6 via the torque converter 4 to shift gears, is output to the wheels as vehicle travelling drive force.

The engine 2 is an in-line 4-cylinder engine, V-6 cylinder engine, or the like. A combustion chamber 8 is defined in each cylinder of the engine 2. The combustion chamber 8 is supplied with ambient air and fuel through an intake port 14. The air is drawn into an intake passage 10 and regulated by a throttle valve 12. An air filter is located at the distal end of the intake passage 10. The fuel is injected from a fuel injection valve 16 into the intake port 14. The fuel may be directly injected into the combustion chamber 8. An ignition plug 18 ignites and burns the mixture of air and fuel in the combustion chamber 8. This reciprocates a piston 20, which in turn, rotates a crankshaft 22, which is an output shaft of the engine 2. The burned mixture is discharged from the combustion chamber 8 into an exhaust passage 24 as exhaust gas. In the engine 2, an intake valve 26 opens and closes to connect and disconnect the combustion chamber 8 and the intake passage 10. An exhaust valve 28 opens and closes to connect and disconnect the combustion chamber 8 and the exhaust passage 24. An intake camshaft 30 and an exhaust camshaft 32, to which the rotation of the crankshaft 22 is transmitted, open and close the intake valve 26 and the exhaust valve 28, respectively.

An electronic control unit (hereinafter simply referred to as the "EG-ECU") 34 is installed in the vehicle to control operation of the engine 2. Controls such as a throttle opening control, ignition timing control, fuel injection control, and the like are executed for the engine 2 by the EG-ECU 34. The EG-ECU 34 receives detection signals from various sensors of the engine 2. The engine 2 includes an engine speed sensor 36 for detecting the rotation of the crankshaft 22 (engine speed NE), a cam position sensor 38 for detecting a rotational position (cam angle) of the intake camshaft 30, and an accelerator operation amount sensor 42 for detecting accelerator operation amount ACCP (%) or the depression amount of the acceleration pedal 40. The engine 2 also includes a throttle opening sensor 44 for detecting throttle opening TA (%) of the throttle valve 12, an intake flow rate sensor 46 for detecting intake air flow rate GA (g/s) of the intake air flowing through the intake passage 10, a coolant temperature sensor 48 for detecting a coolant temperature THW of the engine 2, and the like.

In the engine 2, the EG-ECU 34 drives the throttle valve 12 with an electric motor 12a and adjusts the throttle opening TA so that the engine 2 outputs a driver request torque, which is in accordance with the accelerator operation amount ACCP detected by the accelerator operation amount sensor 42. The throttle valve 12 is also automatically controlled by a vehicle stability control (VSC) system arranged in the EG-ECU 34. This increases and decreases the torque generated by the engine 2 and outputs the torque toward the torque converter 4. An electronic control unit for executing the vehicle stability control may be arranged separately from the EG-ECU 34.

An automatic transmission controller (hereinafter simply referred to as the "ECT-ECU") 50 for executing gearshift control on the automatic transmission 6 detects a rotation speed NT of the output side of the torque converter 4 (input side of the automatic transmission 6) from a torque converter output shaft sensor 52, which is arranged on an output shaft 4a of the torque converter 4. The ECT-ECU 50 also detects the rotation speed Nout at the output side of the automatic transmission 6 from a transmission output shaft sensor 54, which is arranged on an output shaft 6a of the automatic transmission 6, and detects the position of a gearshift lever 55a from a shift position sensor 55. The EG-ECU 34 exchanges information with the ECT-ECU 50.

The ECT-ECU 50 controls a valve in a hydraulic control circuit 56, which is arranged in the automatic transmission 6, to engage and disengage an internal clutch or an internal brake of the automatic transmission 6 and perform gear shifting. The ECT-ECU 50 also adjusts the line pressure, which is the oil pressure communicated from a hydraulic pump to the hydraulic control circuit 56 for gearshift driving, in accordance with the gearshift state and the like by means of an oil pressure adjustment unit 58.

A line pressure control process executed by the ECT-ECU 50 on the oil pressure adjustment unit 58 during gear shifting will now be discussed with reference to the flowchart of FIG. 2. This process is repeatedly executed in fixed time cycles.

When the process starts, the ECT-ECU 50 first calculates an operation state assumption torque Tsn, which is assumed to be actually output from the engine 2, through a functional calculation process ft and maps or the like based on the engine operation state (step S102). For the engine operation state, the intake air flow rate GA actually measured by the intake flow rate sensor 46, the engine speed NE actually measured by the engine speed sensor 36, the accelerator operation amount ACCP actually measured by the accelerator operation amount sensor 42, and the coolant temperature THW actually measured by the coolant temperature sensor 48 are mainly used.

The ECT-ECU 50 then calculates a target torque Tqt in according with a driver request (step S104). The driver request is represented by the accelerator operation amount ACCP, which is the acceleration pedal operation amount, and the accelerator operation amount ACCP is related to the engine speed NE. The ECT-ECU 50 calculates the target torque Tqt from a map tqt based on the accelerator operation amount ACCP and the engine speed NE. The map tqt showing the relationship between the accelerator operation amount ACCP and the engine speed NE, and the target torque Tqt is set in correspondence with the performance design of the engine 2.

The ECT-ECU 50 then determines whether or not gear shifting is being performed (step S106). If gear shifting is not being performed, the present processing is temporarily terminated. In such a case, the line pressure, which is adjusted by the oil pressure adjustment unit 58, is controlled to be in correspondence with the gearshift state.

When in a gear shifting state ("YES" in step S106), the ECT-ECU 50 determines whether or not the present state is before torque reduction, which is associated with the torque reduction process executed during a gear shifting period (step S108). During gear shifting, a torque phase, an inertia phase, and a torque phase are sequentially performed. However, a gear shifting period mainly consists of the inertia phase state. Thus, during the gear shifting period, the ECT-ECU 50 instructs the EG-ECU 34 to perform the torque reduction process so as to switch the internal clutch or the internal brake of the automatic transmission 6. The timing for starting and ending the torque reduction during the torque reduction process may be determined through calculations that use a preset map and the operation state of the engine 2, such as the intake air flow rate GA and the engine speed NE. Alternatively, the timing for starting and ending the torque reduction may be determined by decreasing or recovering of the actual intake air flow rate GA that differs from the driver request.

Gear shifting is initially in a state before torque reduction associated with in the torque reduction process ("YES" in step S108). Thus, the ECT-ECU 50 then sets the operation state assumption torque Tsn calculated in present step S102 as a base assumption torque Tsnbase (step S110). Further, the ECT-ECU 50 sets the operation state assumption torque Tsn as an assumption torque Tect (step S112).

The oil pressure control, specifically, the adjustment of the line pressure PL in the oil pressure adjustment unit 58 is executed based on the assumption torque Tect (step S118).

The torque reduction process starts from a state before the torque reduction associated with the torque reduction process. Thus, when the torque is actually reduced during the torque reduction, such a state is no longer before torque reduction ("NO" in step S108). Therefore, the ECT-ECU 50 next determined whether or not torque reduction associated with the torque reduction process is being performed (step S114). If torque reduction is being performed, the assumption torque Tect is calculated by adding an assumption model torque change amount ΣTDmdl, which is calculated based on a delay model of the engine 2, to the base assumption torque Tsnbase, which was finally calculated in step S110, as expressed by equation 1 (step S116).

$$Tect \leftarrow Tsnbase + \Sigma TDmdl \qquad [\text{Equation 1}]$$

Figure 2:
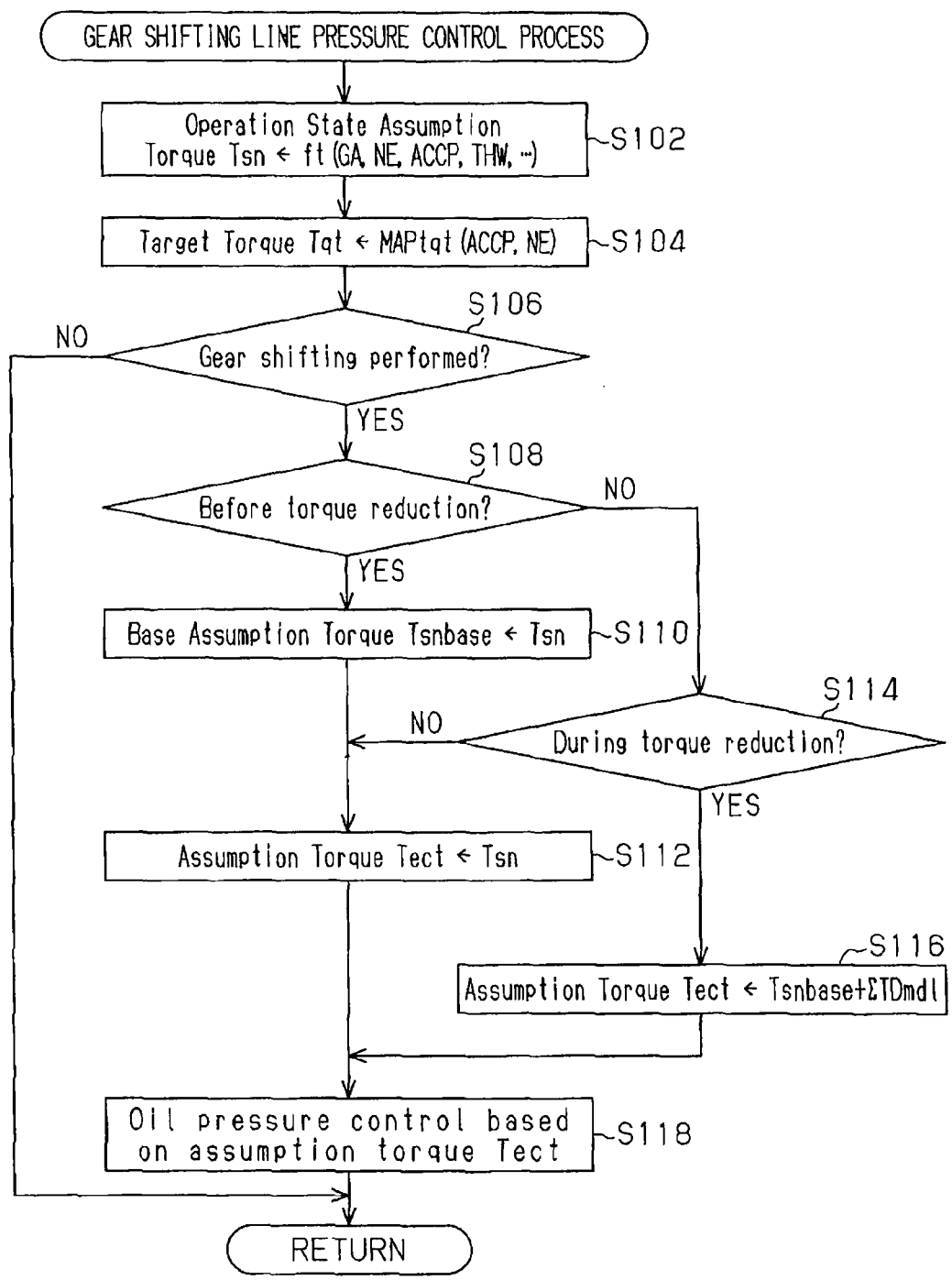
FIG. 2 is a flowchart of a line pressure control process executed by an ECT-ECU of the first embodiment.
Figure 3:
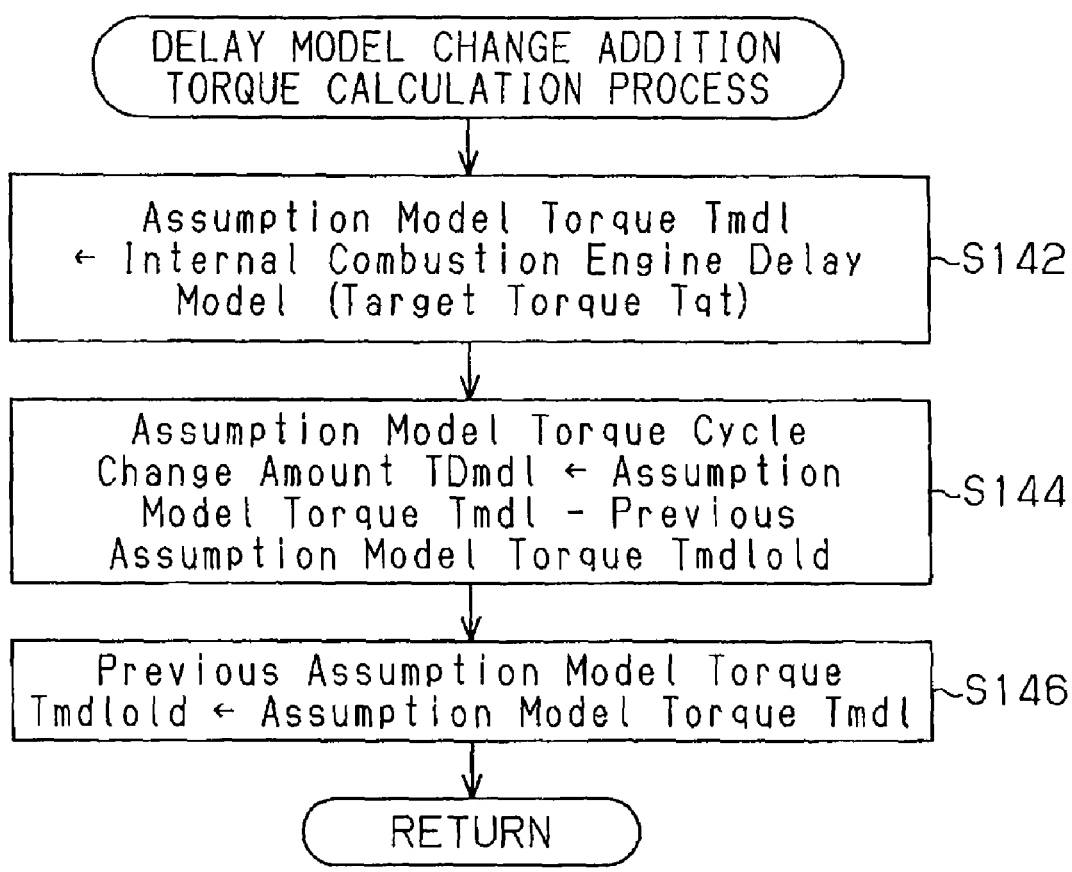
FIG. 3 is a flowchart of a delay model change addition torque calculation process.

Here, the assumption model torque change amount ΣTDmdl is a value obtained by adding in each cycle an assumption model torque cycle change amount TDmdl, which is obtained through a delay model change addition torque calculation process shown in the flowchart of FIG. 3 executed in the same cycle as the line pressure control process (FIG. 2).

The delay model change addition torque calculation process (FIG. 3) will now be described. When the present process (FIG. 3) starts, the assumption model torque Tmdl is first calculated based on the target torque Tqt from an internal combustion engine delay model expressed by equation 2 (step S142).

$$Tmdl \leftarrow \{1/(Ts+1)\} \cdot e[-Ls] \cdot Tqt \qquad [\text{Equation 2}]$$

Here, Ts represents a time constant of a primary delay, e[−Ls] represents −Ls power of a Napier number e, and Ls represents wasted time.

Therefore, this model is an internal combustion engine delay model in which the time constant Ts and the wasted time Ls are set in correspondence with the engine 2.

The assumption model torque Tmdl obtained from the internal combustion engine delay model in such a manner is used to set the difference from the previous assumption model torque Tmdlold obtained from the internal combustion engine delay model in the previous cycle for the assumption model torque cycle change amount TDmdl as shown in equation 3 (step S144).

$$TDmdl \leftarrow Tmdl - Tmdlold \qquad [\text{Equation 3}]$$

The present assumption model torque Tmdl is then set as the previous assumption model torque Tmdlold (step S146), and the processing is temporarily terminated. The above-described process is subsequently repeated in cycles.

Returning to the discussion of the line pressure control process (FIG. 2), as described above, the assumption model torque cycle change amount TDmdl, which is cyclically calculated and updated in the delay model change addition torque calculation process (FIG. 3), is integrated as the assumption model torque change amount ΣTDmdl and then added to the base assumption torque Tsnbase as in equation 1 in step S116. Accordingly, during torque reduction, the assumption torque Tect changes in correspondence to changes in the assumption model torque Tmdl using the base assumption torque Tsnbase as a base and starting from the value of the base assumption torque Tsnbase.

The oil pressure control is executed based on the assumption torque Tect, which is changed by the assumption model torque change amount ΣTDmdl in such a manner (step S118).

After the torque reduction associated with the torque reduction process ends and in a state after the torque reduction ("NO" in step S114), the process of step S116 shown in equation 1 is not carried out. The ECT-ECU 50 returns to the process of setting the operation state assumption torque Tsn relative to the assumption torque Tect (step S112).

Figure 4:
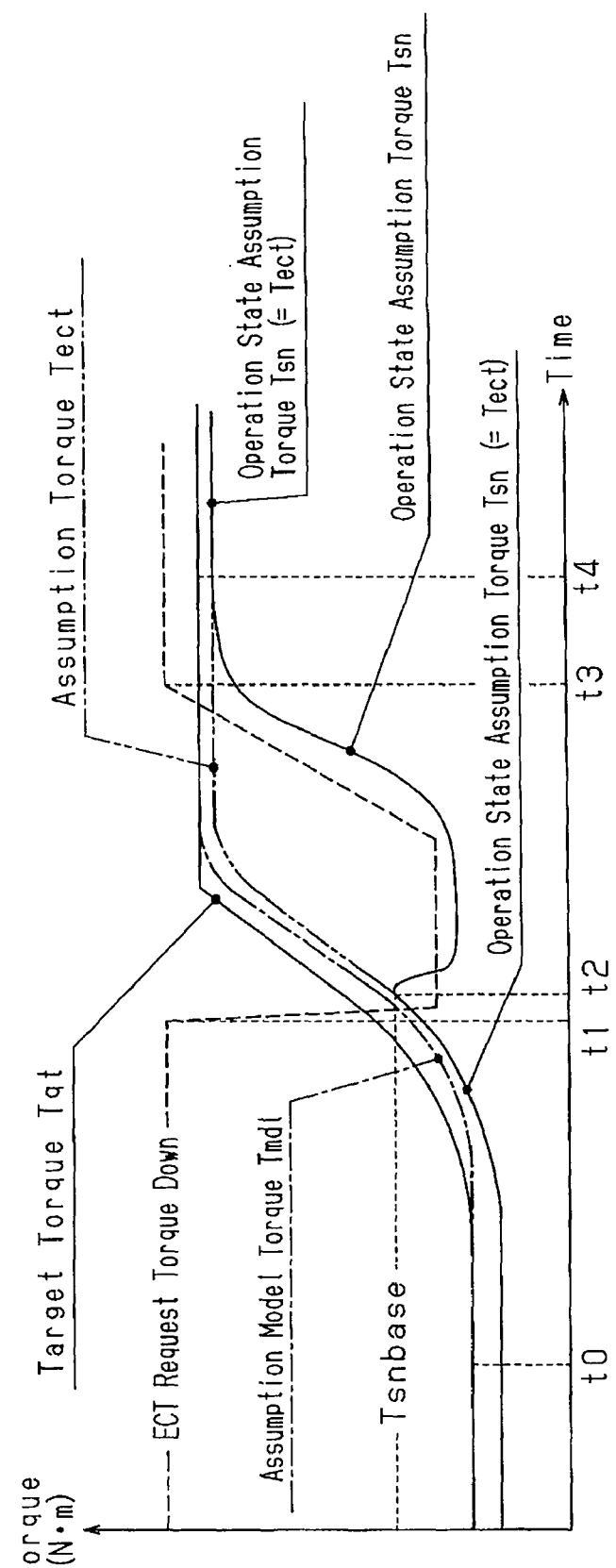
FIG. 4 is a timing chart showing one example of a control in the first embodiment.

FIG. 4 shows one example of the control executed in this embodiment. As shown in FIG. 4, the ECT-ECU 50 enters the gear shift process at timing t0, and the EG-ECU 34 executes the torque reduction process from timing t1 in accordance with the torque reduction request from the ECT-ECU 50. The torque reduction associated with the torque reduction process actually occurs from timing t2. Before the torque reduction (t0 to t2), the operation state assumption torque Tsn is set as the assumption torque Tect. During the torque reduction (t2 to t4), the value obtained by adding the assumption model torque change amount ΣTDmdl to the base assumption torque Tsnbase calculated the last immediately before timing t2 is used as the assumption torque Tect, as shown by the double-dashed line. After the torque reduction (t4-), the assumption torque Tect returns to the value of the operation state assumption torque Tsn.

In the above-described structure, the ECT-ECU 50 corresponds to the assumption torque setting device, the automatic transmission controller, the assumption model torque calculation unit, the assumption torque calculation unit, the first assumption torque calculation unit, the second assumption torque calculation unit, and the third assumption torque calculation unit. Step S142 of the delay model change addition torque calculation process (FIG. 3) corresponds to the process executed by the assumption model torque calculation unit, and steps S102 and S112 of the line pressure control process (FIG. 2) correspond to the processes executed by the first assumption torque calculation unit and the third assumption torque calculation unit. Steps S110 and S116 and steps S144 and S146 of the delay model change addition torque calculation process (FIG. 3) correspond to the process executed by the second assumption torque calculation unit. The process executed by the first assumption torque calculation unit and the second assumption torque calculation unit corresponds to the process executed by the assumption torque calculation unit.

The first embodiment of the present invention has the advantages described below.

(1) During a gear shifting period and before the torque reduction, the operation state assumption torque Tsn is set for the assumption torque Tect (step S112). Thus, the assumption torque Tect corresponds to the actual engine operation state, and a highly accurate assumption torque Tect reflecting the response state of the internal combustion engine is obtained.

During torque reduction ("YES" in step S114), the assumption torque Tect is calculated by adding the change amount $\Sigma$TDmdl of the assumption model torque Tmdl to the base assumption torque Tsnbase or the final assumption torque calculated before the torque reduction (step S116).

Thus, even if a step exists between the operation state assumption torque Tsn calculated based on the engine operation state and the assumption model torque Tmdl, the assumption model torque Tmdl is reflected on the assumption torque Tect in a state in which the step is excluded. This eliminates the step from the assumption torque Tect.

A highly accurate assumption torque Tect smoothly varied during the gear shifting period is obtained by taking the response state of the engine 2 into consideration in the above manner. Thus, the ECT-ECU 50 performs highly accurate and smooth gear shift control while suppressing gear shifting shock.

(2) In a state after torque reduction ("NO" in step S114), the operation state assumption torque Tsn is used for the assumption torque Tect (step S112). Until immediately before torque reduction, the assumption torque Tect that smoothly varies based on the internal combustion engine delay model is calculated. This ensures that the assumption torque Tect smoothly returns to be in correspondence with the engine operation state.

(3) Due to advantages (1) and (2), a highly accurate assumption torque is obtained that smoothly varies during the gear shifting period in the oil pressure control for the automatic transmission 6. Thus, the engagement and disengagement of the internal clutch or the internal brake of the automatic transmission 6 are smoothly performed. This effectively prevents shocks from being produced during gear shifting.

Second Embodiment

Figure 5:
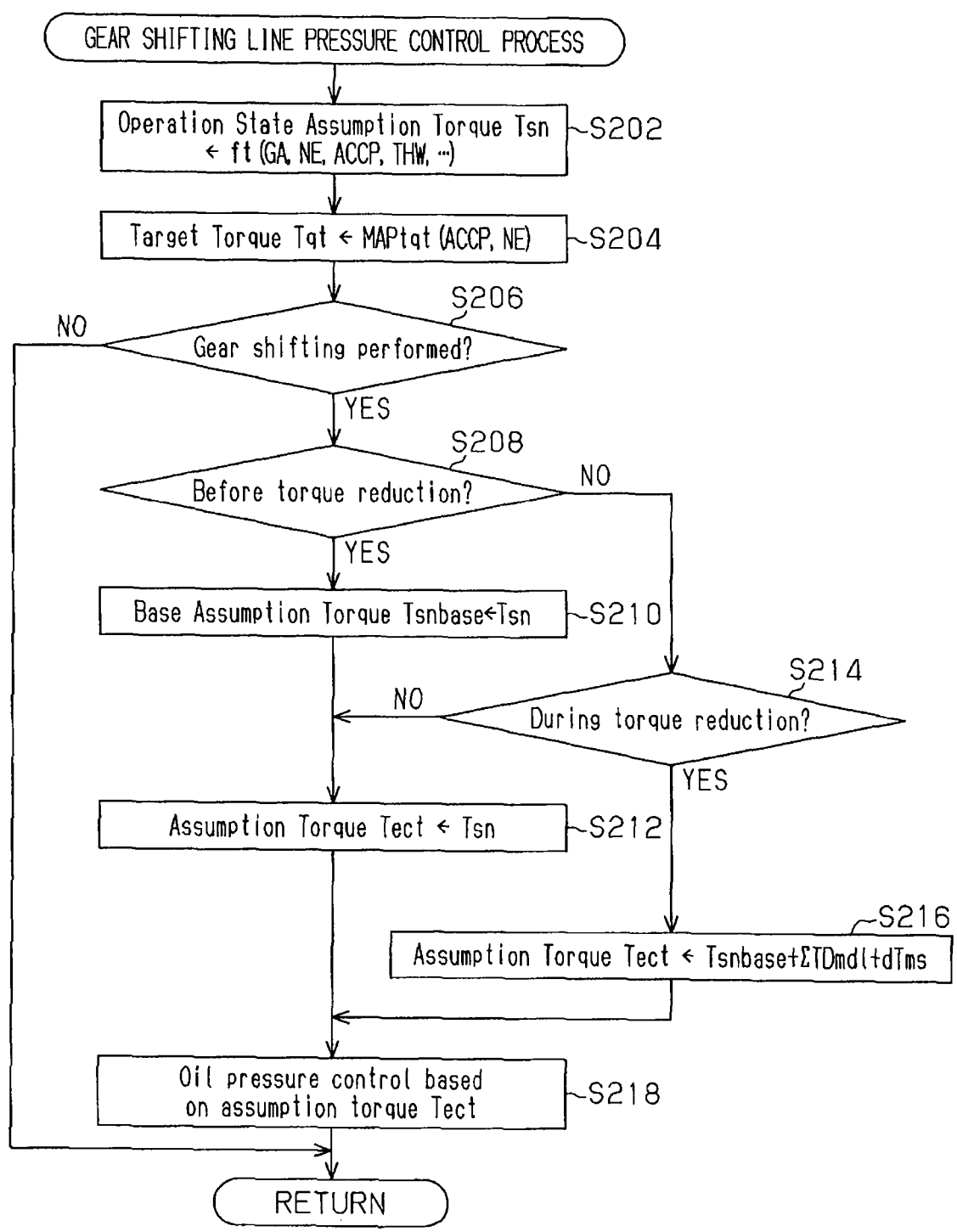
FIG. 5 is a flowchart of a line pressure control process executed by an ECT-ECU in a second embodiment.
Figure 6:
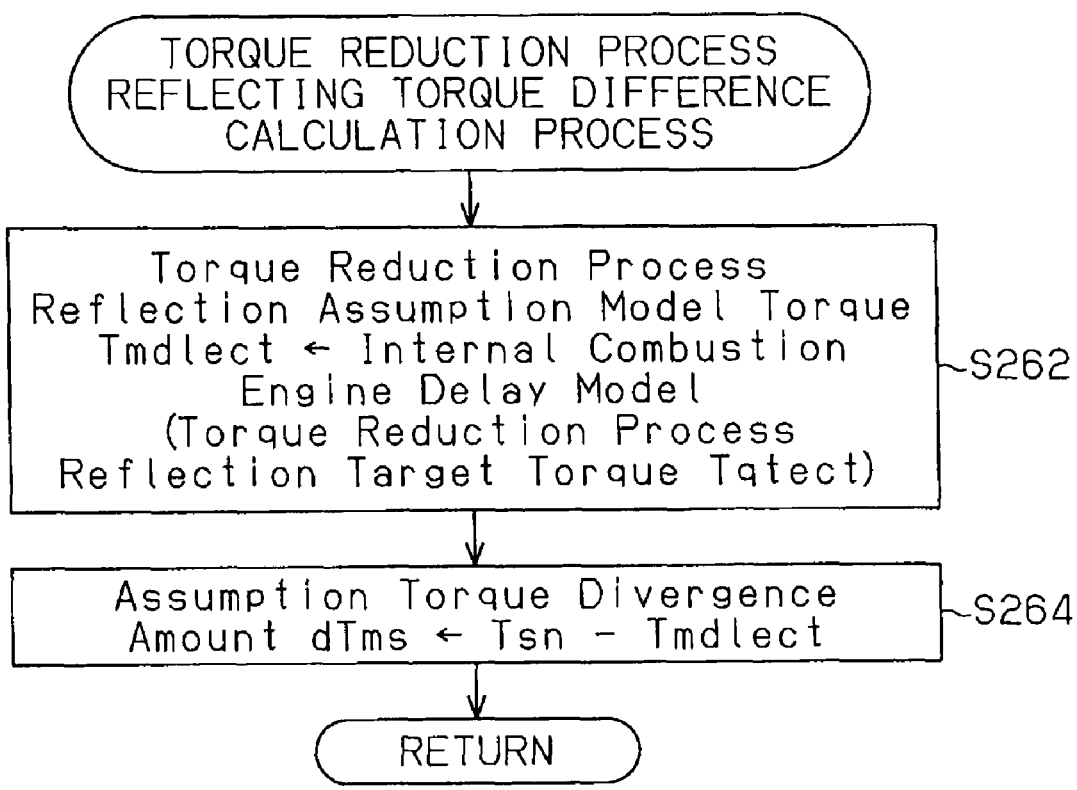
FIG. 6 is a flowchart of a torque reduction process reflecting torque difference calculation process.

In this embodiment, the line pressure control process shown in FIG. 5 is executed in lieu of that shown in FIG. 2 during gear shifting. Furthermore, a torque reduction process reflecting torque difference calculation process shown in FIG. 6 is executed. The delay model change addition torque calculation process (FIG. 3) is executed in the same manner as the first embodiment. Otherwise, the second embodiment is the same as the first embodiment. Therefore, the second embodiment will be discussed with reference to FIG. 1.

The line pressure control process (FIG. 5) differs from that of FIG. 2 in that the calculation of the assumption torque Tect (step S216) is performed using equation 4 instead of equation 1 of the first embodiment during torque reduction ("YES" in step S214). Steps S202 to S214 and S218 are the same as steps S102 to S114 and S118 of FIG. 2.

$$\text{Tect} \leftarrow \text{Tsnbase} + \Sigma\text{TDmdl} + \text{dTms} \qquad [\text{Equation 4}]$$

The assumption model torque change amount $\Sigma$TDmdl, which is as described in the first embodiment, is a value obtained by integrating the assumption model torque cycle change amount TDmdl obtained by the delay model change addition torque calculation process (FIG. 3) in each cycle.

Equation 4 differs from equation 1 in that the torque reduction process reflecting torque difference dTms is further added.

The torque reduction process reflecting torque difference dTMs is obtained by the torque reduction process reflecting torque difference calculation process shown in the flowchart of FIG. 6, which is executed in the same cycle as the line pressure control process (FIG. 5).

The torque reduction process reflecting torque difference calculation process (FIG. 6) will now be described. When the present process (FIG. 6) starts, a torque reduction process reflecting assumption model torque Tmdlect is calculated based on a torque reduction process reflecting target torque Tqtect using the internal combustion engine delay model expressed by equation 2 described in step S142 of FIG. 3 (step S262).

The torque reduction process reflecting target torque Tqtect is a target torque request from the ECT-ECU 50 to the EG-ECU 34 for performing torque reduction during a gear shifting period. The torque reduction process reflecting target torque Tqtect is shown by a broken line indicated as "ECT request torque down" in FIG. 7, which will be described later.

Accordingly, the torque reduction process reflecting assumption model torque Tmdlect obtained from the calculation of the internal combustion engine delay model in step S262 is also reduced in correspondence with the torque reduction process reflecting target torque Tqtect.

An assumption torque divergence amount dTms is calculated from equation 5 (step S264).

$$\text{dTms} \leftarrow \text{Tsn} - \text{Tmdlect} \qquad [\text{Equation 5}]$$

In other words, the assumption torque divergence amount dTms is calculated as the torque difference between the operation state assumption torque Tsn assuming the actual reduced torque and the torque reduction process reflecting assumption model torque Tmdlect using the internal combustion engine delay model. The assumption torque divergence amount dTms represents the torque difference between the actual torque and the model torque with high accuracy.

The torque reduction process reflecting torque difference calculation process (FIG. 6) is temporarily terminated. This process is cyclically performed.

In the line pressure control process (FIG. 5), the operation state assumption torque Tsn is set as the assumption torque Tect before and after the torque reduction (step S212). Therefore, this period is the same as the first embodiment. However, during the torque reduction ("YES" in step S214), the assumption torque Tect is set taking into further consideration the assumption torque divergence amount dTms from the first embodiment (step S216).

Figure 7:
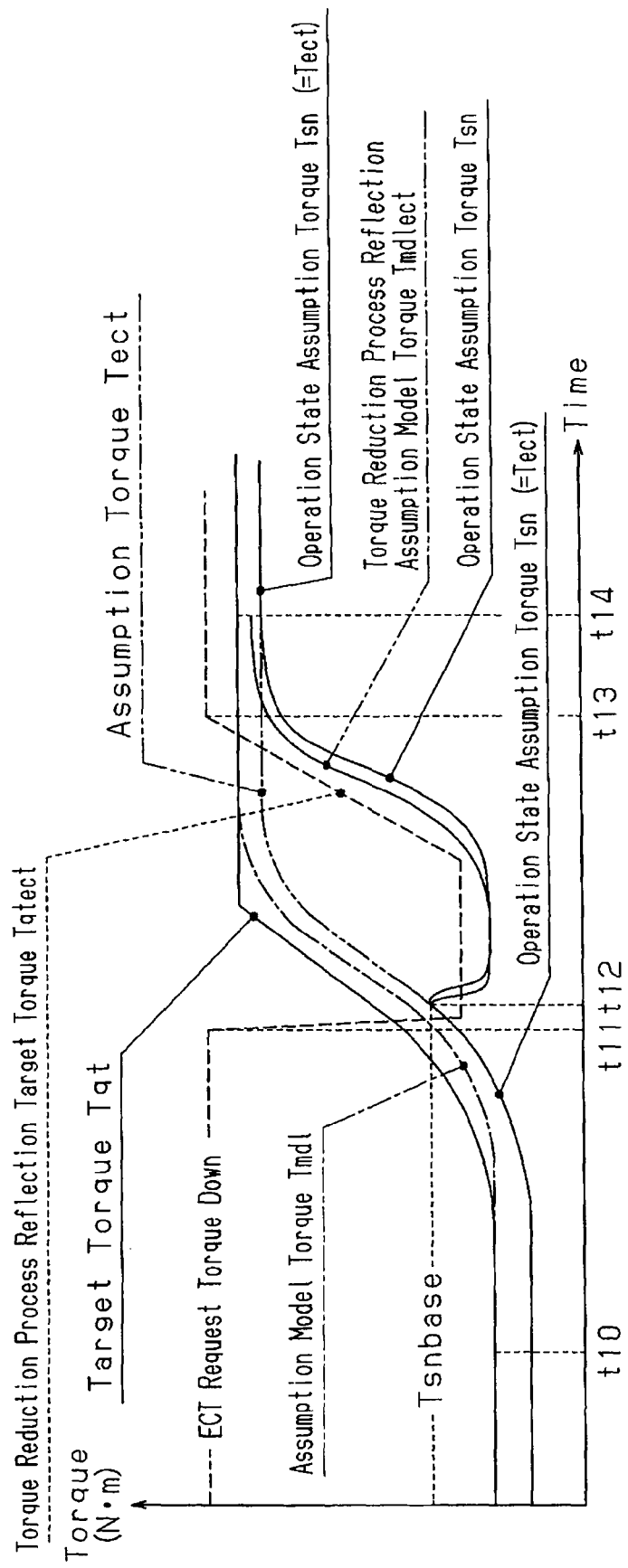
FIG. 7 is a timing chart showing one example of a control of the second embodiment.

One example of the control executed in this embodiment is shown in the timing chart of FIG. 7. As shown in FIG. 7, the ECT-ECU 50 starts the gear shifting process at timing t10, and the ECT-ECU 50 requests for the torque reduction process so that the EG-ECU 34 executes the torque reduction process from timing t11. The torque reduction associated with the torque reduction process occurs from timing t12. Before the torque reduction (t10 to T12), the operation state assumption torque Tsn is set as the assumption torque Tect. However, during the torque reduction (t12 to t14), a value obtained by adding the assumption model torque change amount ΣTDmdl and the assumption torque divergence amount dTms to the final base assumption torque Tsnbase, which is calculated immediately before timing t12, is used as the assumption torque Tect. After the torque reduction (t14-), the assumption torque Tect returns to the value of the operation state assumption torque Tsn.

In the above-described structure, the ECT-ECU 50 corresponds to the assumption model torque calculation unit, the assumption torque calculation unit, the torque reduction process reflecting assumption model torque calculation unit, the first assumption torque calculation unit, the torque reduction process reflecting assumption torque calculation unit, the second assumption torque calculation unit, and the third assumption torque calculation unit. Step S142 of the delay model change addition torque calculation process (FIG. 3) corresponds to the process executed by the assumption model torque calculation unit, and steps S202 and S212 of the line pressure control process (FIG. 5) correspond to the processes executed by the first assumption torque calculation unit and the third assumption torque calculation unit. Steps S210 and S216, steps S144 and S146 of the delay model change addition torque calculation process (FIG. 3), and step S264 of the torque reduction process reflecting torque difference calculation process (FIG. 6) correspond to the process executed by the second assumption torque calculation unit. Step S262 of the torque reduction process reflecting torque difference calculation process (FIG. 6) corresponds to the process executed by the torque reduction process reflecting assumption model torque calculation unit, and step S202 of the line pressure control process (FIG. 5) corresponds to the process executed by the torque reduction process reflecting assumption torque calculation unit.

The second embodiment has the advantages described above.

(1) In addition to the advantages of the first embodiment, in the second embodiment, the assumption torque Tect is calculated by adding the assumption model torque change amount ΣTDmdl and the assumption torque divergence amount dTms to the base assumption torque Tsnbase, as shown in equation 4, during torque reduction in a gear shifting period. Since the assumption torque divergence amount dTms is taken into consideration, a further accurate assumption torque Tect is smoothly varied without any steps during a gear shifting period. Thus, even if a step cannot be completely prevented as the assumption torque Tect increases or decreases due to the assumption model torque change amount ΣTDmdl during torque reduction, such a step would be effectively suppressed.

Third Embodiment

Figure 8:
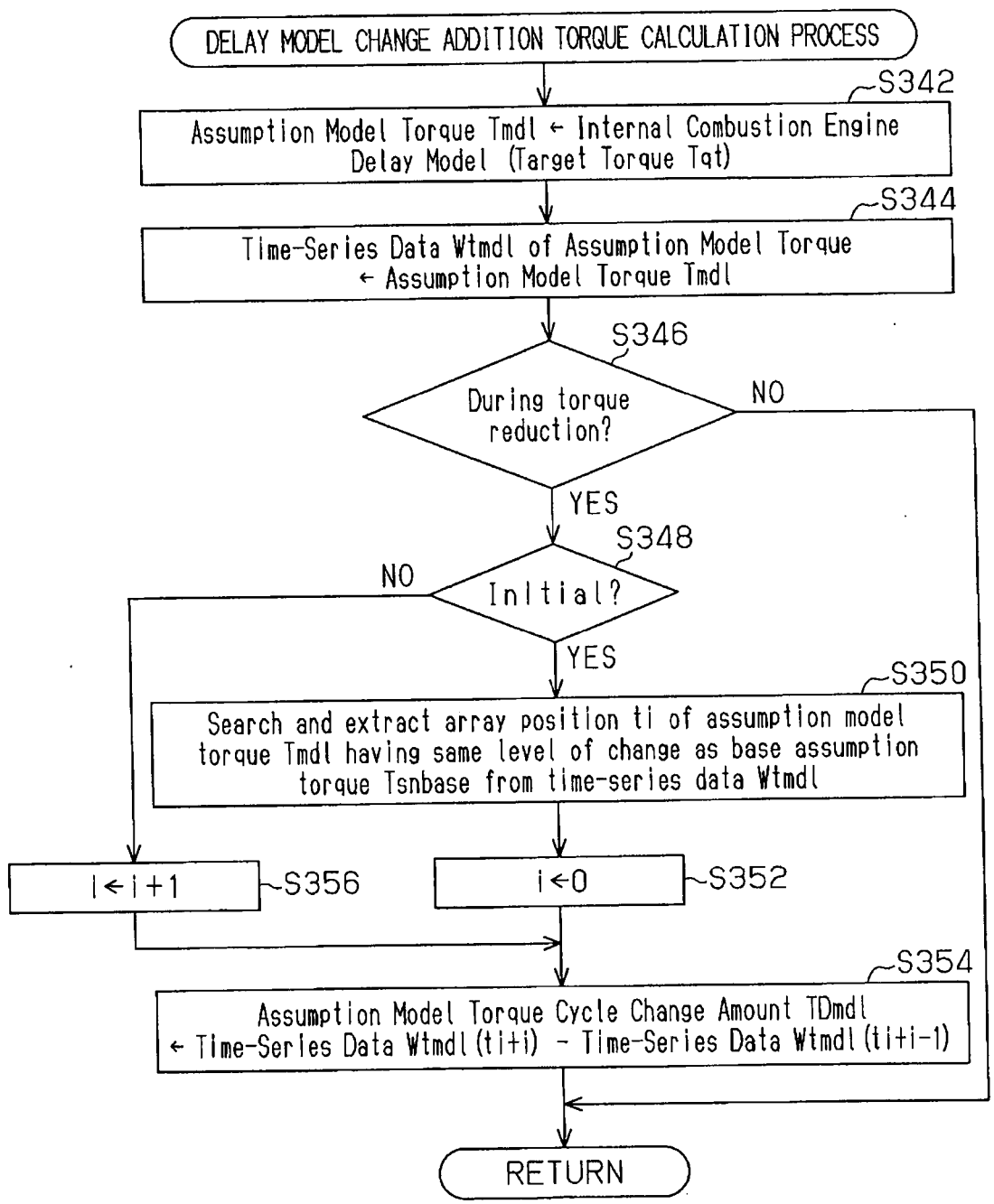
FIG. 8 is a flowchart of a delay model change addition torque calculation process executed by an ECT-ECU of a third embodiment.

In this embodiment, a delay model change addition torque calculation process shown in FIG. 8 is executed in lieu of that in the first or the second embodiment and shown in FIG. 3. Otherwise, the third embodiment is the same as the first or the second embodiment. Therefore, the third embodiment will be discussed with reference to FIGS. 1, 2, 5, and 6.

The delay model change addition torque calculation process (FIG. 8) of this embodiment is executed in the same cycle as FIG. 3. However, the calculation of the assumption model torque cycle change amount TDmdl is different.

When the delay model change addition torque calculation process (FIG. 8) starts, the assumption model torque Tmdl is first calculated based on the target torque Tqt by the internal combustion engine delay model (step S342). This process is the same as step S142 of FIG. 3 and is calculated by using equation 2.

The assumption model torque Tmdl is then calculated and stored as time-series data Wtmdl (step S344). That is, the assumption model torque Tmdl is stored in a memory of the ECT-ECU 50 as array data in a timely order (cycle order).

It is then determined whether or not torque reduction is actually being performed (step S346). If torque reduction is not being performed, the process is temporarily terminated.

The processes of calculating the assumption model torque Tmdl (step S342) and storing that value as the time-series data Wtmdl (step S344) are executed in the next control cycle, and if torque is not being performed reduction ("NO" in step S346), the process is repeatedly terminated.

Subsequently, in the torque reduction ("YES" in step S346), it is determined whether or not this is the initial process performed during the torque reduction (step S348). If it is the initial process, an array position ti of the assumption model torque Tmdl of the same level of change as the base assumption torque Tsnbase set in step S110 or S210 of the line pressure control process (FIG. 2 or FIG. 5) is searched and extracted from the time-series data Wtmdl (step S350).

Figure 9:
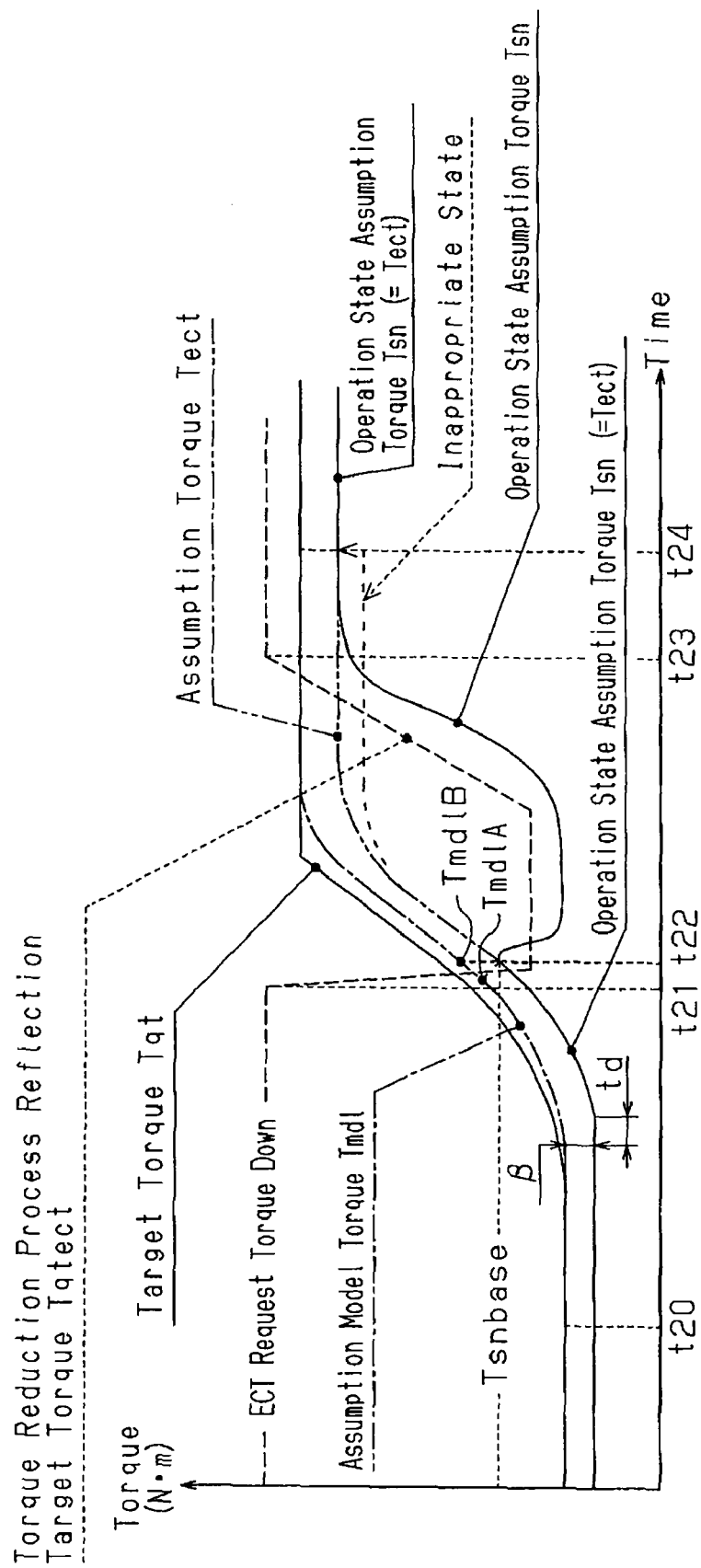
FIG. 9 is a timing chart showing one example of a control of the third embodiment.

With regarding to the assumption model torque Tmdl, which has the same level of change as the base assumption torque Tsnbase, if a difference β exists in a stable state immediately before the present timing as shown in the timing chart of FIG. 9, the value of the assumption model torque TmdlA (=Tsnbase+β) corresponds to the assumption model torque Tmdl that has the same level of change as the base assumption torque Tsnbase.

The value of the assumption model torque Tmdl in the time-series data Wthmdl is calculated and stored for each cycle. Thus, the value in which the level of change is exactly the same does not necessarily exist. For this reason, if a value (Tsnbase+β) of the same level of change as the base assumption torque Tsnbase exists, such a value would be the "assumption model torque Tmdl of the same level of change as the base assumption torque Tsnbase". If a value (Tsnbase+β) of the same level of change as the base assumption torque Tsnbase does not exist, the closest value would be the "assumption model torque Tmdl of the same level of change as the base assumption torque Tsnbase".

In addition to searching and extracting the array position ti, a shift time td of the start of change between the base assumption torque Tsnbase and the assumption model torque Tmdl may be obtained as shown in the timing chart of FIG. 9, and the array position ti of the assumption model torque Tmdl stored in the time-series data Wtmdl before such shift time may be extracted in step S350.

After extracting the array position ti in the above-described manner, a position counter i is then cleared (step S352). Then, the assumption model torque cycle change amount TDmdl is calculated as expressed by equation 6 (step S354).

$$TDmdl \leftarrow Wtmdl(ti+i)+Wtmdl(ti+i-1) \qquad \text{[Equation 6]}$$

Here, Wtmdl(ti+i) represents the ti+i$^{th}$ data of the time-series data, and Wtmdl(ti+i−1) represents the ti+t−1$^{th}$ data of the time-series data.

Extraction starts from the assumption model torque Tmdl of the same level of change as the base assumption torque Tsnbase.

In the next control cycle, the process is not the initial process in the torque reduction ("NO" in step S348). Thus, the position counter i is incremented (step S356), and the new assumption model torque cycle change amount TDmdl is calculated with equation 6 using the incremented position counter i (step S354). Thereafter, during the torque reduction ("YES" in step S346, "NO" in step S348), the processes of extracting the assumption model torque Tmdl while shifting the data position in the time-series data Wtmdl one by one and calculating the assumption model torque cycle change amount TDmdl with equation 6 (step S354) are repeated.

In step S116 or S216 of the line pressure control process (FIG. 2 or FIG. 5), the assumption model torque cycle change amount TDmdl calculated in the above manner is integrated to obtain the change amount ΣTDmdl of the assumption model torque Tmdl. This value is added to the base assumption torque Tsnbase or the final assumption torque calculated before the torque reduction. The assumption torque Tect is thus calculated as expressed by equation 1 or equation 4.

One example of a control executed in this embodiment is shown in the timing chart of FIG. 9. In this example, the delay model change addition torque calculation process of FIG. 8 is executed in lie of that of the first embodiment shown in FIG. 3. As shown in the drawing, the ECT-ECU 50 enters the gear shift processing at timing t20, and the EG-ECU 34 executes the torque reduction process from timing t21 in accordance with the torque reduction request. The torque reduction associated with the torque reduction process actually occurs from timing t22. The operation state assumption torque Tsn is set as the assumption torque Tec before torque reduction (t20 to t22). However, a value obtained by adding the assumption model torque change amount ΣTDmdl to the final base assumption torque Tsnbase calculated immediately before timing t22 is used as the assumption torque Tect during the torque reduction (t22 to t24).

The assumption model torque change amount ΣTDmdl added to the base assumption torque Tsnbase is not obtained by integrating the assumption model torque cycle change amount TDmdl from timing t22. The assumption model torque cycle change amount TDmdl of the same level of change as the base assumption torque Tsnbase at timing t22 is extracted from the time-series data Wtmdl and integrated for use as the assumption model torque change amount ΣTDmdl. In the example of FIG. 9, the change from the assumption model torque TmdlA is extracted.

If a large time difference exists between the operation state assumption torque Tsn and the assumption model torque Tmdl due to wasted time, the integration of the assumption model torque cycle change amount TDmdl from timing t22 would become the integration from the assumption model torque TmdlB. Thus, as shown by the broken line, appropriate adding would ultimately not be performed, and a large step may be produced in the assumption torque Tect when the assumption torque Tect is returned to the value of the operation state assumption torque Tsn at the end of torque reduction (t24). However, in this embodiment, the step is sufficiently suppressed by taking into consideration the value difference or the time difference produced in terms of value or in terms of time as shown in FIG. 9.

In the same manner, the production of a step is sufficiently suppressed even when the delay model change addition torque calculation process of FIG. 8 is executed in lieu of that of the second embodiment shown in FIG. 3.

The above-described structure differs from the first and second embodiment especially in relation with the claims in that steps S344 to S356 of the delay model change addition torque calculation process (FIG. 8) is included in the processing of the second assumption torque calculation unit in lieu of steps S144 and S146 of the delay model change addition torque calculation process (FIG. 3).

The third embodiment has the advantages described below.

(1) In addition to the advantages of the first and second embodiments, the production of a step at the end of the torque reduction is effectively suppressed by taking into consideration the wasted time in terms of value or in terms of time as illustrated in FIG. 9.

Fourth Embodiment

Figure 10:
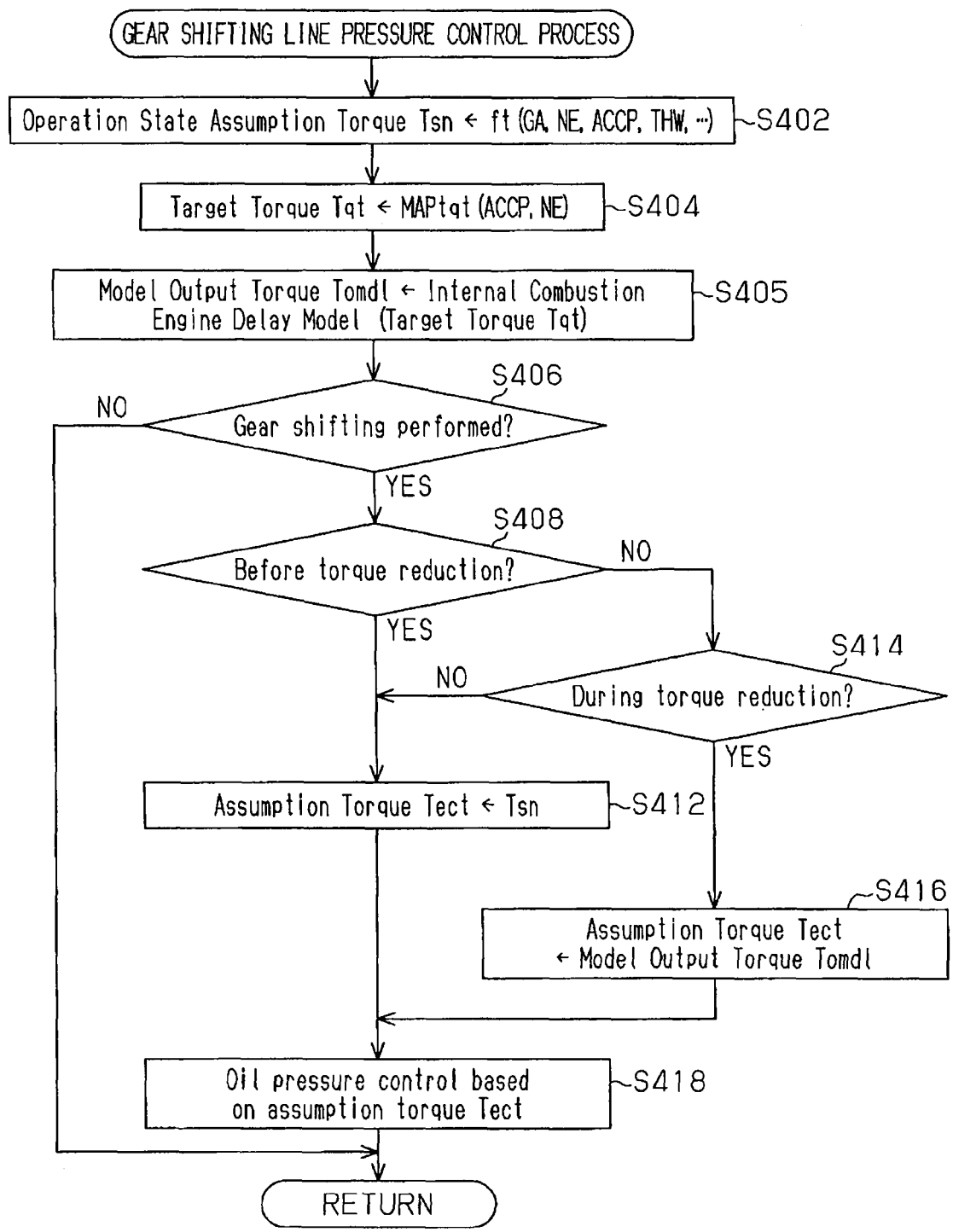
FIG. 10 is a flowchart of a line pressure control process executed by an ECT-ECU of the fourth embodiment.
Figure 11:
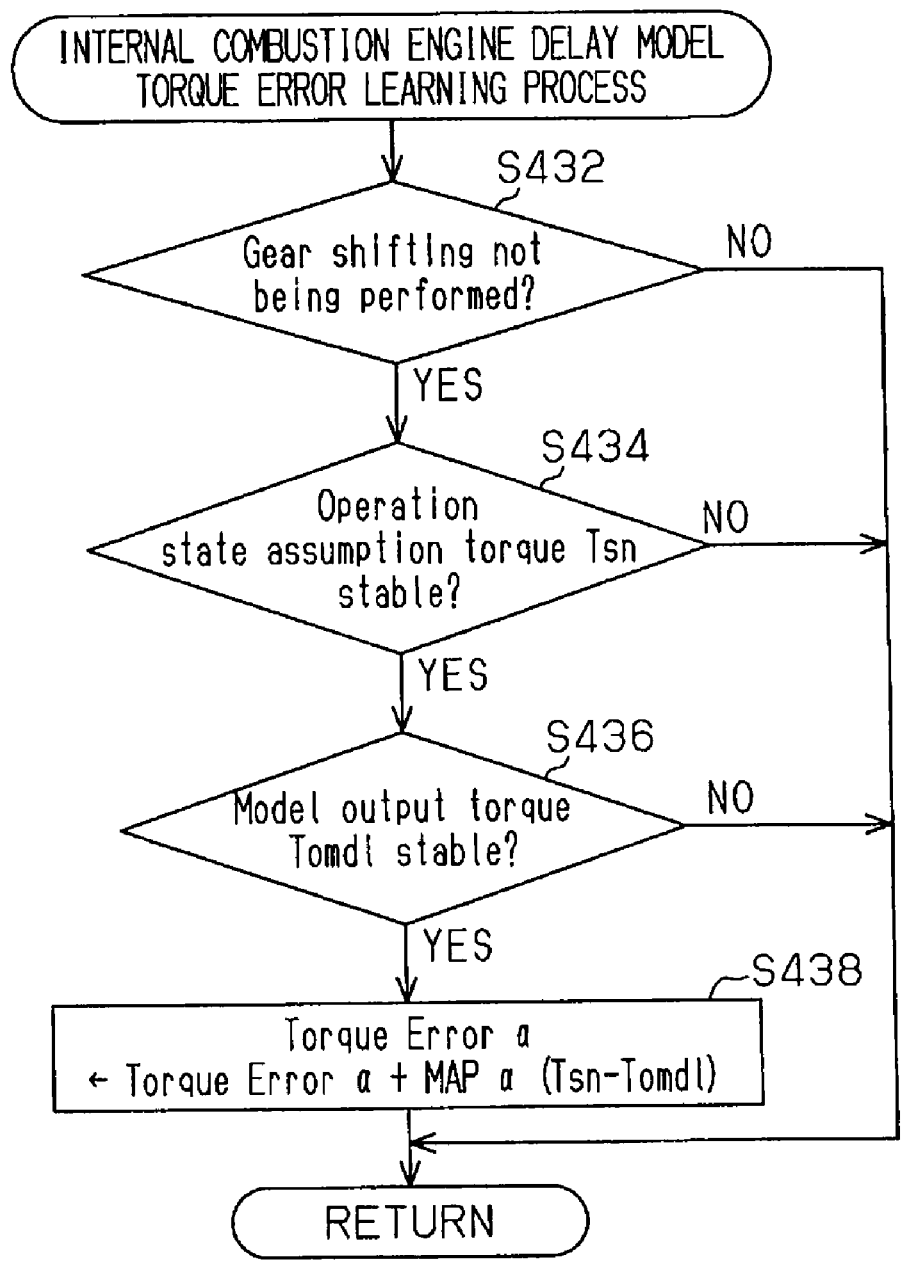
FIG. 11 is a flowchart of an internal combustion engine delay model torque error learning process.
Figure 12:
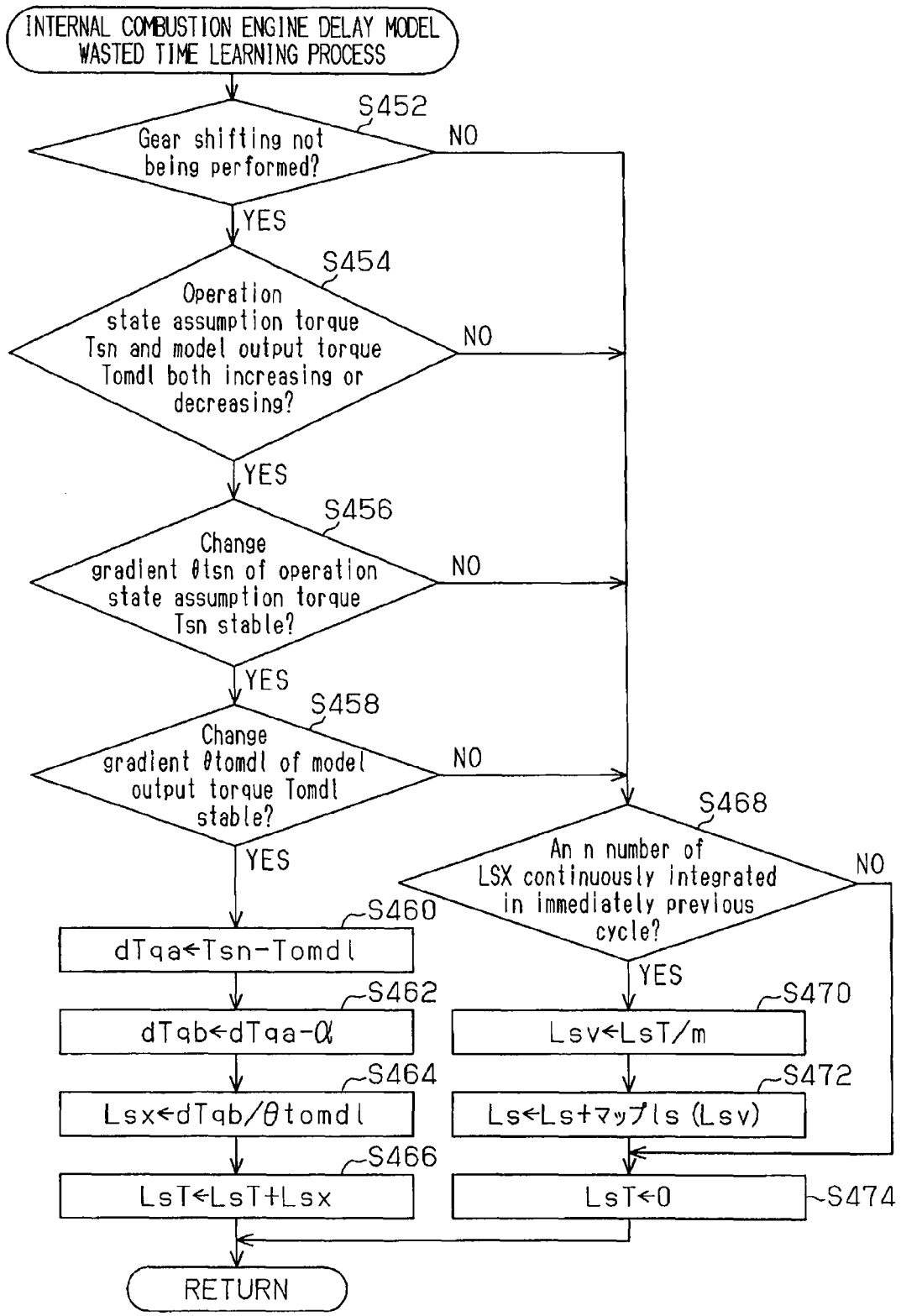
FIG. 12 is a flowchart of an internal combustion engine delay model wasted time learning process.
Figure 13:
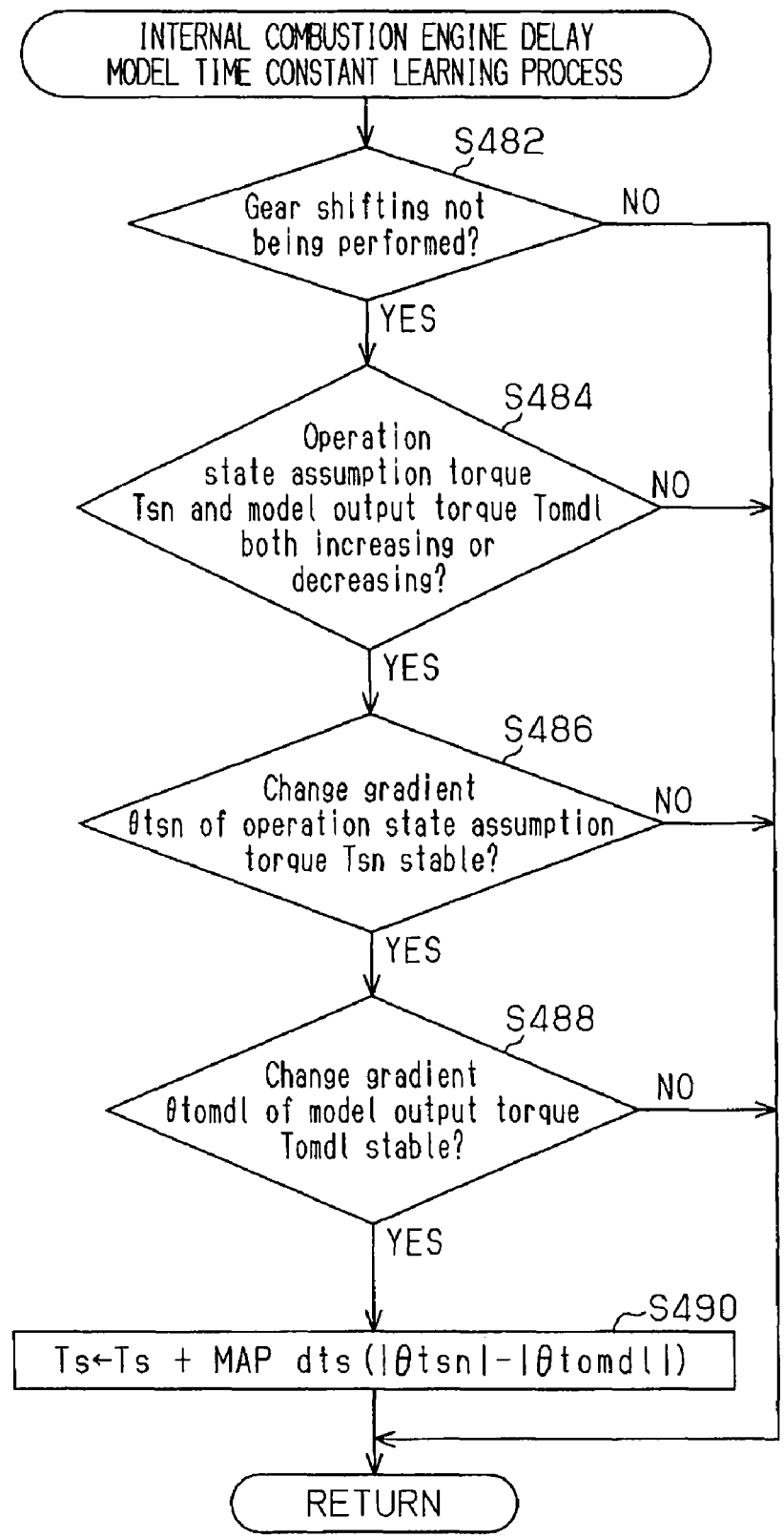
FIG. 13 is a flowchart of an internal combustion engine delay model time constant learning process.

In this embodiment, the line pressure control process shown in FIG. 10 is executed in lieu of that of FIG. 2 of the first embodiment. The process of FIG. 3 is not executed. Instead, an internal combustion engine delay model learning process of FIGS. 11, 12, and 13 is executed. Otherwise the fourth embodiment is the same as the first embodiment. Therefore, this fourth embodiment will be discussed with reference to FIG. 1.

The line pressure control process (FIG. 10) differs from FIG. 2 in that the process of setting the base assumption torque Tsnbase (FIG. 2: step S110) is not performed and in that a process of calculating the model output torque Tomdl based on the target torque Tqt through the internal combustion engine delay model is executed (step S405). The internal combustion engine delay model is as expressed by equation 7.

$$Tomdl \leftarrow \{1/(Ts+1)\} \cdot e[-Ls] \cdot Tqt + \alpha \quad \text{[Equation 7]}$$

Here, Ts represents the time constant of a primary delay, e[−Ls] represents −Ls power of Napier number e, Ls represents wasted time, and α represents torque error.

The delay model is a model set with the time constant Ts, the wasted time Ls, and the torque error α in correspondence to the engine 2 and is set with numerical values corresponding to a standard engine when the vehicle is initially manufactured.

The difference from FIG. 2 is that in the line pressure control process (FIG. 10), during torque reduction ("YES" in step S414), instead of calculating the assumption torque Tect with equation 1 as described in the first embodiment, the model output torque Tomdl obtained from equation 7 is set (step S416).

The other steps S402, S404, S406 to S414, and S418 are the same as steps S102 to S108, S112, S114, and S118 of FIG. 2.

FIGS. 11 to 13 show processes for adapting the internal combustion engine delay model shown in equation 7 to the actual internal combustion engine by learning the torque error α, the wasted time Ls, and the time constant Ts. The processes of FIGS. 11 to 13, and the line pressure control process (FIG. 10) are repeatedly executed in interruptions and in the same cycle.

The internal combustion engine delay model torque error learning or determination process (FIG. 11) will now be described. When the processing starts, it is first determined whether or not gear shifting is presently being performed (step S432). The present process is temporarily terminated if gear shifting is presently being performed.

If gear shifting is not being performed ("YES" in step S432), it is determined whether or not the operation state assumption torque Tsn is in a stable state (step S434). The stable state is when a state in which there is barely any fluctuation in the operation state assumption torque Tsn, that is, a state in which the fluctuation amount per unit time is continuously less than zero or less than a predetermined fluctuation determination reference value over a predetermined time. The present process is temporarily terminated if not in the stable state.

If the operation state assumption torque Tsn is in a stable state ("YES" in step S434), it is determined whether or not the model output torque Tomdl is in a stable state (step S436). The stable state is a state in which there is barely any fluctuation in the model output torque Tomdl and is determined in the same manner as when determining a stable state of the operation state assumption torque Tsn performed in step S434. The present process is temporarily terminated if not in the stable state.

If the model output torque Tomdl is in a stable state ("YES" in step S436), the torque error α is updated by the learning process as expressed by equation 8 (step S438).

$$\alpha \leftarrow \alpha + \text{map } \alpha(\text{Tsn}-\text{Tomdl}) \qquad \text{[Equation 8]}$$

Figure 14:
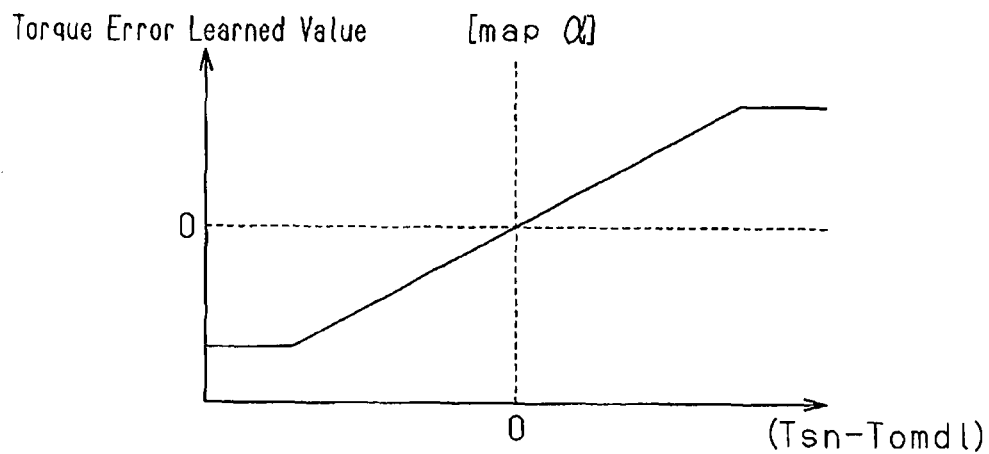
FIG. 14 is a graph showing map α used in the internal combustion engine delay model torque error learning process.
Figure 17:
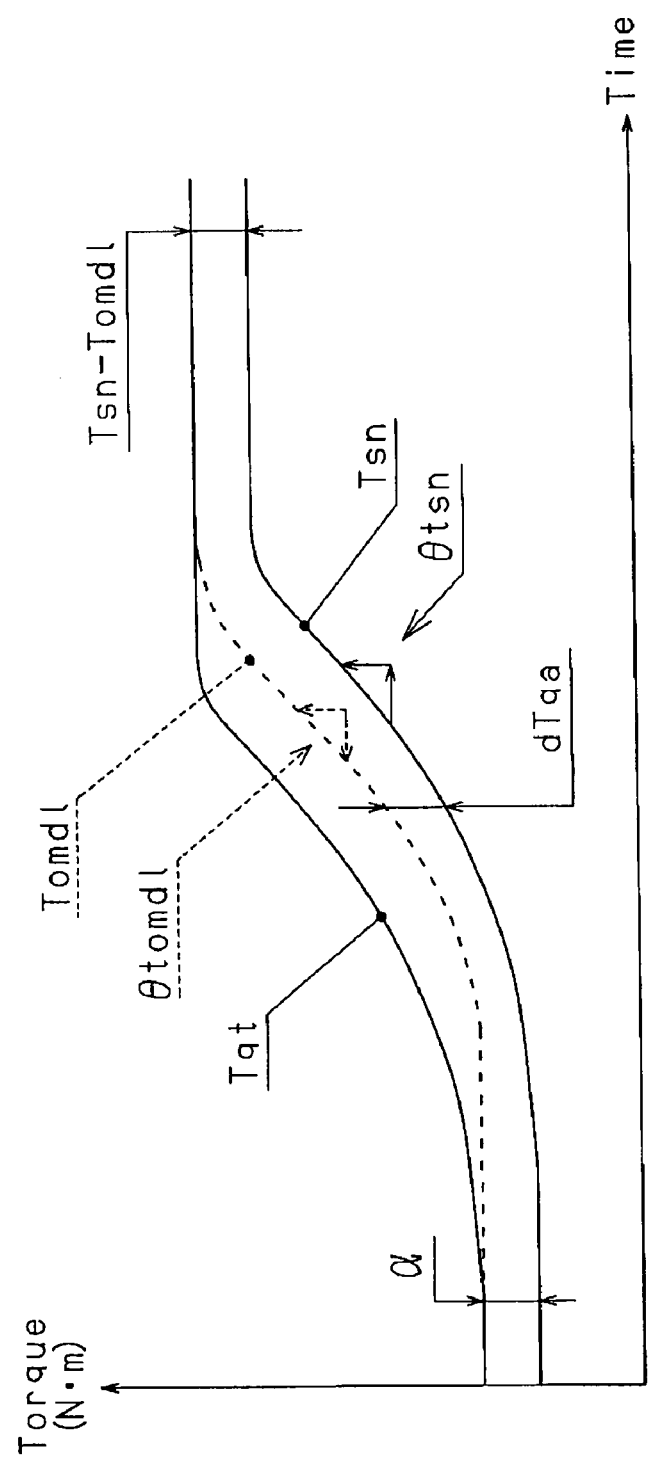
FIG. 17 is a timing chart showing one example of the process performed in the fourth embodiment.

Here, map α is used to calculate a torque error learning value for adapting the torque error α to the actual torque error based on the difference between the operation state assumption torque Tsn and the model output torque Tomdl as shown on the right side of the timing chart of FIG. 17, which will be described later. For instance, the map is set as shown in FIG. 14.

Therefore, a new torque error α is calculated by adding the torque error learning value map α (Tsn−Tomdl), which is calculated in accordance with the difference between the operation state assumption torque Tsn and the model output torque Tomdl, to the original torque error α on the right side of equation 8. In this manner, the learning of the torque error α is performed.

The learning is repeated for the torque error α by repeating the above-described processes so that the delay model of the internal combustion engine expressed by equation 7 becomes an appropriate delay model actually adapted in relation to the torque error α.

The internal combustion engine delay model wasted time learning or determination process (FIG. 12) will now be described. When the processing starts, it is first determined whether or not gear shifting is being performed (step S452). When gear shifting is being performed, it is determined whether or not the cycle calculation wasted time Lsx has been continuously integrated for n times or more in the immediately previous cycle (step S468). The integration of the cycle calculation wasted time Lsx will be described later. In this case, the cycle calculation wasted time Lsx has not been integrated continuously for n times or more in the immediately previous cycle. Thus, the wasted time integration value LsT is cleared (step S474), which will be described later, and the present process is temporarily terminated.

If gear shifting is not being performed ("YES" in step S452), it is determined whether the operation state assumption torque Tsn and the model output torque Tomdl are both increasing or decreasing (step S454). The absolute value of the gradient of change is used when determining whether the operation state assumption torque Tsn and the model output torque Tomdl are both increasing or decreasing. It is determined. If the absolute value is greater than or equal to a certain value, a state of increasing or decreasing is determined.

If determined as "NO" in step S468 when both or either one of the operation state assumption torque Tsn and the model output torque Tomdl are stable or not changing with a satisfactory gradient, the wasted time integration value LsT is cleared (step S474), and the present processing is temporarily terminated.

If the operation state assumption torque Tsn and the model output torque Tomdl are both increasing or decreasing ("YES" in step S454), it is determined whether or not the change gradient θtsn of the operation state assumption torque Tsn is in a stable state (step S456). In this case, a stable state is a state in which the fluctuation amount per unit time of the change gradient θtsn is continuously zero or less than the fluctuation determination reference value for a predetermined time. If determined as "NO" in step S468 when not in a stable state, the wasted time integration value LsT is cleared (step S474), and the present process is temporarily terminated.

If the change gradient θtsn of the operation state assumption torque Tsn is in the stable state ("YES" in step S456), it is determined whether or not the change gradient θtomdl of the model output torque Tomdl is in the stable state. A stable state is a state in which the fluctuation amount per unit time of the change gradient θtomdl is continuously zero or less than the fluctuation determination reference value for a predetermined time. If determined as "NO" in step S468 when not in a stable state, the wasted time integration value LsT is cleared (step S474), and the present process is temporarily terminated.

If the change gradient θtomdl of the model output torque Tomdl is in a stable state ("YES" in step S458), the torque difference dTqa (shown at the center of FIG. 17) between the operation state assumption torque Tsn and the model output torque Tomdl is calculated as expressed by equation 9 (step S460).

$$dTqa \leftarrow Tsn-Tomdl \qquad \text{[Equation 9]}$$

The torque error α (shown on the left side of FIG. 17) calculated in the internal combustion engine delay model torque error learning process (FIG. 11) is then subtracted from the torque difference dTqa to calculate the torque difference dTqb caused by the wasted time as expressed by equation 10 (step S462).

$$dTqb \leftarrow dTqa-\alpha \qquad \text{[Equation 10]}$$

The torque difference dTqb is then divided by the change gradient θtomdl of the present model output torque Tomdl to calculate the cycle calculation wasted time Lsx as expressed by equation 11 (step S464).

$$Lsx \leftarrow dTqb/\theta tomdl \qquad \text{[Equation 11]}$$

In equation 11, the torque difference dTqb may be divided by the change gradient θtsn of the operation state assumption torque Tsn instead of the change gradient θtomdl of the model output torque Tomdl. Alternatively, the torque difference dTqb may be divided by the change gradient of the target torque Tqt for the portion that changes in the same manner as the gradients of change θtomdl and θtsn.

The cycle calculation wasted time Lsx is then added to the wasted time integration value LsT (step S466). The present process is then temporarily terminated.

Thereafter, if the state in which "YES" determinations are continuously given in all of steps S452 to S458, the process of calculating the cycle calculation wasted time Lsx through steps S460 to S464 and adding the cycle calculation wasted time Lsx to the wasted time integration value LsT in step S466 is repeated.

If a "NO" determination is given in any one of the steps S452 to S458, it is determined whether or not the cycle calculation wasted time Lsx has been continuously integrated for n times or more times in the immediately previous cycle (step S468) If the cycle calculation wasted time Lsx has been continuously integrated for m (≧n) times, then an average value Lsv of the wasted time integration value LsT is calculated as expressed by equation 12 (step S470).

$$Ls \leftarrow LsT/m \qquad [\text{Equation 12}]$$

Then, the learning value is calculated from the map is based on the average value Lsv to update the wasted time Ls as expressed by equation 13 (step S472).

$$Ls \leftarrow Ls + \text{map ls (Lsv)} \qquad [\text{Equation 13}]$$

Figure 15:
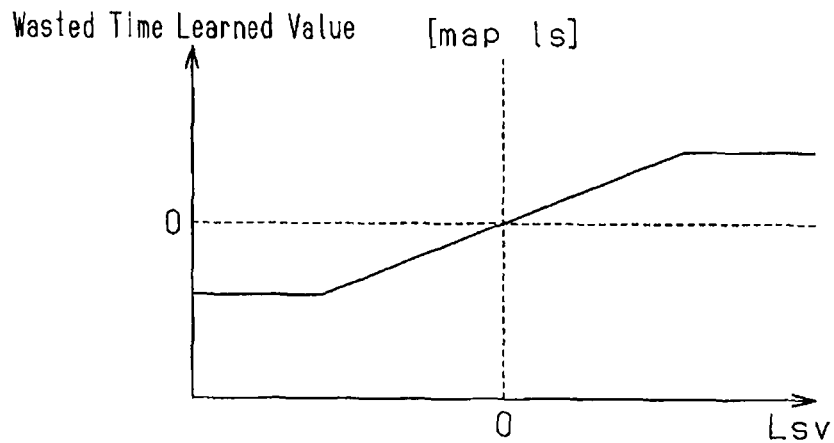
FIG. 15 is a graph showing a map ls used in the internal combustion engine delay model wasted time learning process.

Here, the map is used to calculate the wasted time learning value for adapting the wasted time Ls to the actual wasted time based on the average value Lsv of the wasted time integration value LsT. For example, the map is set as shown in FIG. 15.

Accordingly, the new wasted time Ls is calculated by adding the wasted time learning value map ls (Lsv), which is calculated in accordance with the average value Lsv, to the original wasted time Ls on the right side of equation 13. In this manner, the learning of the wasted time Ls is carried out.

The learning or determination of the wasted time Ls is repeated by repeating the above-described processes, and the delay model of the internal combustion engine expressed by equation 7 becomes an appropriate delay model that is actually adapted in relation to the wasted time Ls.

The internal combustion engine delay model time constant learning or determination process (FIG. 13) will now be described. The determination processes of steps S482 to S488 in the present processing are the same as the determination processes of steps S452 to S458 of the internal combustion engine delay model wasted time learning process (FIG. 12).

When the present processing starts, the determinations of the steps S482 to S488 are performed. However, if a "NO" determination is given in any one of these step, the present process is temporarily terminated.

If a "YES" determination is given in all of steps S482 to S488, the process expressed by equation 14 is performed (step S490).

$$Ts \leftarrow Ts + \text{mapdts} (|\theta tsn| - |\theta tomdl|) \qquad [\text{Equation 14}]$$

That is, the time constant learning value is calculated from a map dts based on a difference between the absolute value of the change gradient θtsn (shown at the center of FIG. 17) of the operation state assumption torque Tsn and the absolute value of the change gradient θtomdl (shown at the center of FIG. 17) of the model output torque Tomdl, and the time constant Ts is updated.

Figure 16:
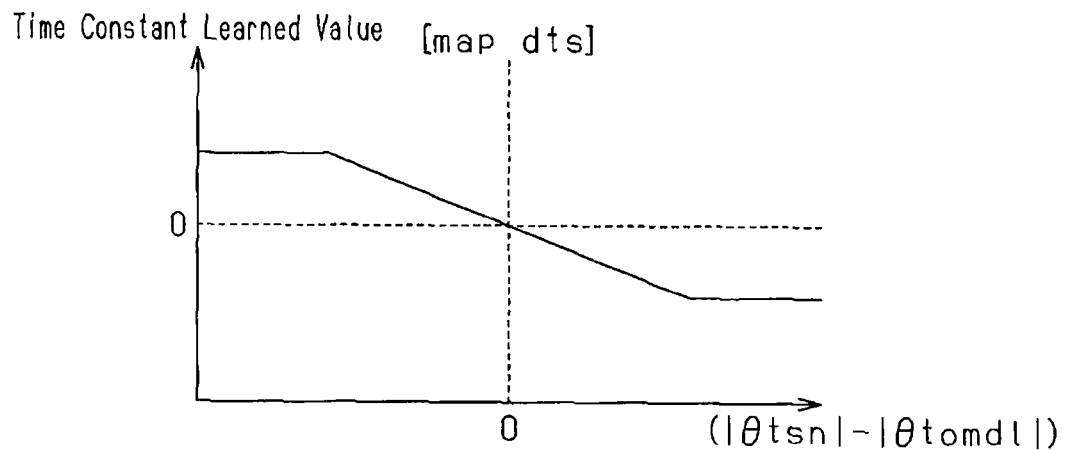
FIG. 16 is a graph showing a map dts used in the internal combustion engine delay model time constant learning process.

The difference between the actual time constant and the time constant Ts of the internal combustion engine delay model is represented by the difference between the change gradient θtsn of the operation state assumption torque Tsn and the change gradient θtomdl of the model output torque Tomdl. The map dts is used to calculate the learning value for setting the time constant Ts to an actually adapted appropriate time constant based on the difference of the absolute values of the two change gradients θtsn and θtomdl. For example, the map dts is set as shown in FIG. 16.

Therefore, the new time constant Ts is calculated by adding a time constant learning value map dts (|θtsn|−|θtomdl|) to the original time constant Ts on the right side of equation 14. In this manner, the learning of the time constant Ts is performed.

The learning or determination is repeated by repeating the above-described processes, and the internal combustion engine delay model expressed by equation 7 becomes the appropriate delay model actually adapted in relation to the time constant Ts.

Figure 18:
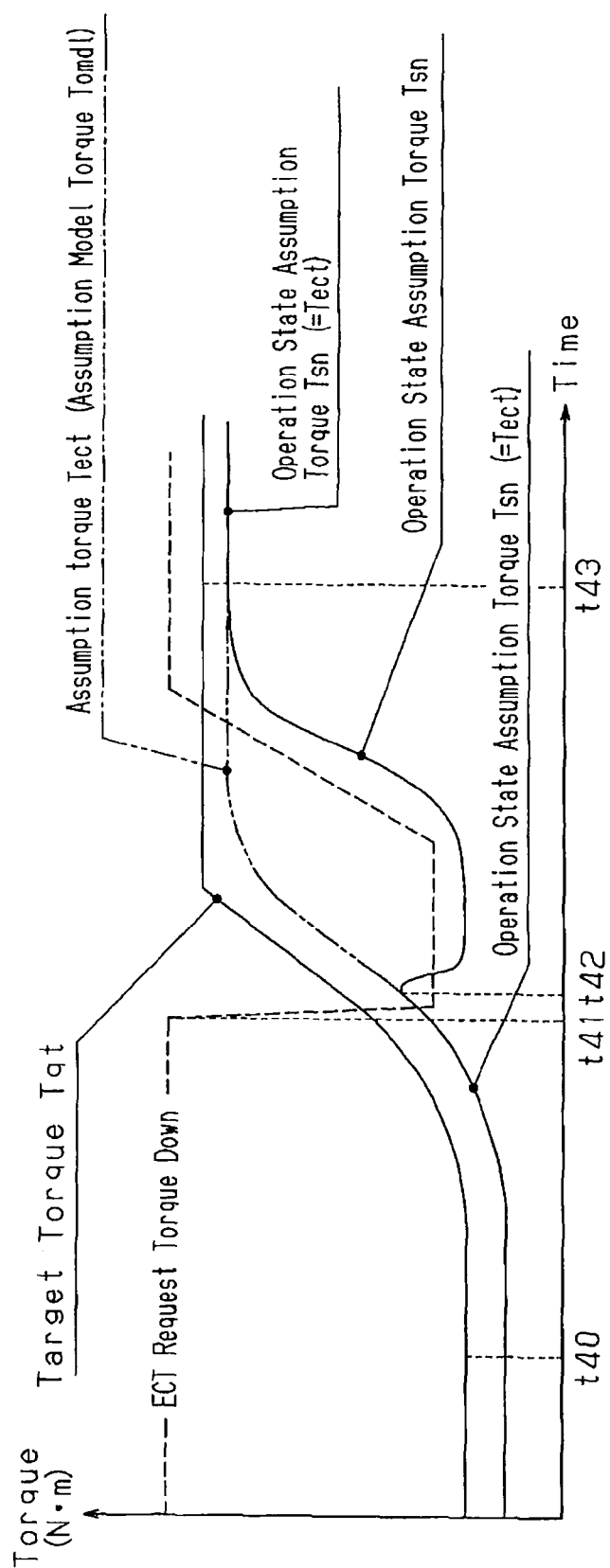
FIG. 18 is a timing chart showing one example of the process performed in the fourth embodiment.

Through the above-described process, as shown in the timing chart of FIG. 18, during gear shifting (t40-), the operation state assumption torque Tsn is set for the assumption torque Tect before the torque reduction (t40 to t42) or at after the torque reduction (t43-) (FIG. 10: S412). During torque reduction (t42 to t43) ("YES" in step S414), the model output torque Tomdl adapted to the actual engine 2 by the learning process (FIGS. 11 to 13) is set as the assumption torque Tect (S416).

In relationship with the claims, the ECT-ECU 50 corresponds to the model adaptation unit, the first assumption torque calculation unit, the second assumption torque calculation unit, and the third assumption torque calculation unit. The three learning process (FIGS. 11, 12, 13) correspond to the processing for the model adaptation unit, steps S402, S412 of the line pressure control process (FIG. 10) correspond to the processing of the first assumption torque calculation unit and the third assumption torque calculation unit, and steps S404, S405, S416 correspond to the processing of the second assumption torque calculation unit.

The fourth embodiment has the advantages described below.

(1) Through the three learning process (FIGS. 11, 12, 13), the learning or determination of the delay state when the internal combustion engine is operating in a state other than gear shifting, in particular, the learning of the primary delay time constant Ts, the wasted time Ls, and the torque error α that are used as parameters is performed to adapt the internal combustion engine delay model to the actual engine 2.

Accordingly, the assumption torque Tect is high accurate and subtly diverged from the actual torque when setting the model output torque Tomdl, which is calculated from the target torque Tqt excluding the torque reduction process based on the internal combustion engine delay model during torque reduction, as the assumption torque Tect. Thus, the production of a step in the assumption torque Tect is also suppressed when using the assumption torque Tect based on the internal combustion engine delay model following the assumption torque Tect set with the operation state assumption torque Tsn before torque reduction. In the same manner, the production of a step in the assumption torque Tect is also suppressed when using the assumption torque Tect set by the operation state assumption torque Tsn after torque reduction.

In this manner, highly accurate assumption torque Tect that smoothly varies during a gear shifting period is obtained, and a highly accurate and smooth gear shifting control becomes possible while suppressing gear shifting shocks.

It should be apparent to those skilled in the art that the present invention may be embodied in many other specific forms without departing from the spirit or scope of the invention. Particularly, it should be understood that the present invention may be embodied in the following forms.

If the values of the torque error α, the wasted time Ls, and the time constant Ts are not yet sufficiently converged in the fourth embodiment, the high accurate assumption torque Tect that smoothly varies may be set through the processes of one of the first to the third embodiments along with the execution of the learning process (FIGS. 11, 12, 13). The learning may be stopped after the values of the torque error α, the wasted time Ls, and the time constant Ts are all sufficiently converged by the learning process, and the process may be switched to the process of only the fourth embodiment.

In the fourth embodiment, all of the learning processes (FIGS. 11, 12, 13) do not necessarily need to be executed, and only particularly important learning processes may be executed. For example, only the internal combustion engine delay model torque error learning process (FIG. 11) may be executed. Alternatively, only two processes, namely, the process of FIG. 11 and the internal combustion engine delay model wasted time learning process (FIG. 12) may be executed. As another option, only two processes, namely, the internal combustion engine delay model time constant learning process (FIG. 13) and either one of the other two processes (FIGS. 11 and 12) may be executed.

All of the learning processes (FIGS. 11, 12, and 13) do not have to be simultaneously executed, and the learning process having a large influence on control, such as the internal combustion engine delay model torque error learning process (FIG. 11), may be executed first. Further, the execution of the internal combustion engine delay model wasted time learning process (FIG. 12) may be started after the torque error α is sufficiently converged, and the internal combustion engine delay model time constant learning process (FIG. 13) may be started after the wasted time Ls is sufficiently converged. This eliminates the risk of hunting or the like occurring due to mutual interference during learning and thereby converges the learning value at an early stage.

In step S116 or S216 of the line pressure control process (FIGS. 2 and 5), the assumption model torque cycle change amount TDmdl is integrated to calculate and use the assumption model torque change amount ΣTDmdl. In addition, instead of such integration, the difference of the assumption model torque Tmdl when setting the final base assumption torque Tsnbase from the present assumption model torque Tmdl may be calculated and used as the assumption model torque change amount.

In each of the above-described embodiments, a gasoline engine is used as the internal combustion engine. However, a diesel engine may be used instead. In such a case, the calculation of the operation state assumption torque Tsn uses the fuel injection amount instead of the intake air flow rate GA.

In each of the above-described embodiments, the calculation of the operation state assumption torque Tsn is performed based on the intake air flow rate GA and the like. However, when the valve timing control of the intake valve 26 and the exhaust valve 28 is executed by a valve timing adjustment mechanism, the valve timing is also used as a parameter for the calculation of the operation state assumption torque Tsn. If torque adjustment is performed through ignition timing, the ignition timing is also used as a parameter.

The present examples and embodiments are to be considered as illustrative and not restrictive, and the invention is not to be limited to the details given herein, but may be modified within the scope and equivalence of the appended claims.

What is claimed is:

1. An assumption torque setting device during gear shifting for an internal combustion engine that executes a torque reduction process during a gear shifting period, wherein torque is set that is assumed to be output by the internal combustion engine that is based on a target torque from which an amount corresponding to the torque reduction process is excluded as an assumption torque during the gear shifting period, the assumption torque setting device during gear shifting comprising:
   an assumption model torque calculation unit which calculates an assumption model torque from the target torque from which an amount corresponding to the torque reduction process is excluded based on an internal combustion engine delay model; and
   an assumption torque calculation unit which calculates before torque reduction is performed in the torque reduction process an assumption torque based on an internal combustion engine operation state and which calculates when the torque reduction is being performed in the torque reduction process an assumption torque based on the assumption model torque calculated in the assumption model torque calculation unit and an assumption torque calculated from the internal combustion engine operation state.

2. The assumption torque setting device during gear shifting according to claim 1, wherein the assumption torque calculation unit includes:
   a first assumption torque calculation unit which calculates the assumption torque based on the internal combustion engine operation state before the torque reduction is performed in the torque reduction process during the gear shifting period; and
   a second assumption torque calculation unit which calculates the assumption torque by adding an amount corresponding to a change in the assumption model torque calculated by the assumption model torque calculation unit to the assumption torque finally calculated by the first assumption torque calculation unit when the torque reduction is being performed in the torque reduction process during the gear shifting period.

3. The assumption torque setting device during gear shifting according to claim 1, wherein the assumption torque calculation unit includes:
   a torque reduction process reflecting assumption model torque calculation unit which calculates the assumption model torque from the target torque from which the amount corresponding to the torque reduction process is not excluded based on the internal combustion engine delay model;
   a first assumption torque calculation unit which calculates the assumption torque based on the internal combustion engine operation state before the torque reduction is performed in the torque reduction process during the gear shifting period;
   a torque reduction process reflecting assumption torque calculation unit which calculates the assumption torque based on the internal combustion engine operation state when the torque reduction is being performed in the torque reduction process during the gear shifting period; and
   a second assumption torque calculation unit which calculates the assumption torque by adding to the assumption torque finally calculated by the first assumption torque calculation unit an amount corresponding to a change in the assumption model torque calculated by the assumption model torque calculation unit and a diverged amount of the assumption model torque calculated by the torque reduction process reflecting assumption model torque calculation unit and the assumption torque calculated by the torque reduction process reflecting assumption torque calculation unit when the torque reduction is being performed in the torque reduction process during the gear shifting period.

4. The assumption torque setting device during gear shifting according to claim 2, wherein the second assumption torque calculation unit uses as the amount corresponding to the change in the assumption model torque calculated by the assumption model torque calculation unit an amount corresponding to a change in an assumption model torque having the same level of change in terms of value or time when adding is performed among assumption model torques calculated in the past by the assumption model torque calculation unit.

5. The assumption torque setting device during gear shifting according to claim 1, wherein the internal combustion engine delay model is set based on a response delay in control and wasted time using the target torque as a parameter.

6. The assumption torque setting device during gear shifting according to claim 1, wherein the assumption torque calculation unit calculates the assumption torque based on the internal combustion engine operation state after the torque reduction is performed in the torque reduction process during the gear shifting period.

7. The assumption torque setting device during gear shifting according to claim 1, wherein gear shifting is performed by an automatic transmission.

8. An assumption torque setting device during gear shifting for an internal combustion engine that executes a torque reduction process during a gear shifting period, wherein torque is set that is assumed to be output by the internal combustion engine that is based on a target torque from which an amount corresponding to the torque reduction process is excluded as an assumption torque during the gear shifting period, the assumption torque setting device comprising:
    an internal combustion engine delay model adaptation unit which adapts an internal combustion engine delay model representing delay from the target torque to a torque output to the actual internal combustion engine by learning a delayed state of the internal combustion engine during periods other than the gear shifting period;
    a first assumption torque calculation unit which calculates the assumption torque based on an internal combustion engine operation state before torque reduction is performed in the torque reduction process during the gear shifting period; and
    a second assumption torque calculation unit which calculates the assumption torque from the target torque from which an amount corresponding to the torque reduction process is excluded based on the internal combustion engine delay model when the torque reduction is being performed in the torque reduction process during the gear shifting period.

9. The assumption torque setting device during gear shifting according to claim 6, wherein the internal combustion engine delay model is a model which calculates an output torque based on the target torque by using a primary delay time constant, wasted time, and torque error as parameters.

10. The assumption torque setting device during gear shifting according to claim 9, wherein the internal combustion engine delay model adaptation unit adapts the internal combustion engine delay model to the actual internal combustion engine by learning one or more of the parameters of the primary delay time constant, wasted time, and torque error to learn the delay state in an internal combustion engine operation state other than gear shifting.

11. The assumption torque setting device during gear shifting according to claim 10, wherein the internal combustion engine delay model adaptation unit learns the torque error based on a difference between an output torque, which is calculated from the target torque based on the internal combustion engine delay model, and the assumption torque, which is calculated from the internal combustion engine operation state, when fluctuation is small in both of the output torque and the assumption torque in an internal combustion engine operation state other than gear shifting.

12. The assumption torque setting device during gear shifting according to claim 10, wherein the internal combustion engine delay model adaptation unit learns the primary delay time constant based on a difference in gradients between an output torque, which is calculated from the target torque based on the internal combustion engine delay model, and the assumption torque, which is calculated from the internal combustion engine operation state, when the gradients of both of the output torque and the assumption torque stably change in an increasing manner or a decreasing manner in an internal combustion engine operation state other than gear shifting.

13. The assumption torque setting device during gear shifting according to claim 10, wherein when the gradients of the output torque, which is calculated from the target torque based on the internal combustion engine delay model, and the assumption torque, which is calculated from the internal combustion engine operation state, both stably change in an increasing manner or a decreasing manner in an internal combustion engine operation state other than gear shifting, the internal combustion engine delay model adaptation unit subtracts from the difference between the output torque and the assumption torque a difference produced when fluctuations of the output torque and the assumption torque are small, converts the value obtained through the subtraction to time based on the target torque in a stable changing state and the gradient of the output torque or assumption torque, and learns the wasted time based on the obtained time.

14. A controller for an automatic transmission comprising:
    the assumption torque setting device according to claim 7, wherein the controller executes oil pressure control on the automatic transmission based on the assumption torque set by the assumption torque setting device.

15. A method for learning an internal combustion engine delay model for calculating an output torque based on a target torque by using parameters including a primary delay time constant, wasted time, and torque error via a controller for an automatic transmission, the method comprising:
    learning the torque error based on a difference between an output torque, which is calculated from the target torque based on the internal combustion engine delay model, and the assumption torque, which is calculated from an internal combustion engine operation state, when fluctuation is small in both of the output torque and the assumption torque.

16. The method according to claim 15, further comprising:
    learning the primary delay time constant based on a difference in gradients between the output torque, which is calculated from the target torque based on the internal combustion engine delay model, and the assumption torque, which is calculated from the internal combustion engine operation state, when the gradients of the output torque and the assumption torque stably change in an increasing manner or a decreasing manner in an internal combustion engine operation state other than gear shifting.

17. The method according to claim 16, further comprising:
    when the gradients of the output torque, which is calculated from the target torque based on the internal combustion engine delay model, and the assumption torque, which is calculated from the internal combustion engine operation state, stably change in an increasing manner or a decreasing manner in an internal combustion engine operation state other than gear shifting, subtracting from the difference between the output torque and the assumption torque a difference produced when fluctuations of the output torque and the assumption torque are small, converting the value obtained through the subtraction to time based on the target torque in a stable changing state and the gradient of the output torque or assumption torque, and learning the wasted time based on the obtained time.

* * * * *